US011620198B2

(12) United States Patent
Puvvada et al.

(10) Patent No.: US 11,620,198 B2
(45) Date of Patent: Apr. 4, 2023

(54) EXCHANGING EXTENDED ATTRIBUTES BETWEEN DIFFERENT CLUSTER SITES IN A CLUSTERED FILESYSTEM ENVIRONMENT

(71) Applicant: International Business Machines Corporation, Armonk, NY (US)

(72) Inventors: Venkateswara Rao Puvvada, Inkollu (IN); Karrthik Kalaga Gopalakrishnan, Kodaikanal (IN); Saket Kumar, Bettiah (IN); Ashish Pandey, Pune (IN)

(73) Assignee: International Business Machines Corporation, Armonk, NY (US)

( * ) Notice: Subject to any disclaimer, the term of this patent is extended or adjusted under 35 U.S.C. 154(b) by 120 days.

(21) Appl. No.: 17/337,723

(22) Filed: Jun. 3, 2021

(65) Prior Publication Data
US 2022/0391296 A1    Dec. 8, 2022

(51) Int. Cl.
*G06F 11/00*    (2006.01)
*G06F 11/20*    (2006.01)
(Continued)

(52) U.S. Cl.
CPC ...... *G06F 11/2094* (2013.01); *G06F 11/1435* (2013.01); *G06F 11/1451* (2013.01); *G06F 11/1469* (2013.01); *G06F 16/185* (2019.01)

(58) Field of Classification Search
CPC ...... G06F 3/065; G06F 3/067; G06F 2201/84; G06F 11/1435; G06F 11/1451;
(Continued)

(56) References Cited

U.S. PATENT DOCUMENTS

| 2013/0268493 A1 * | 10/2013 | Berman .............. G06F 11/1469 707/649 |
| 2019/0196736 A1 | 6/2019 | Hasegawa et al. |

(Continued)

FOREIGN PATENT DOCUMENTS

| WO | WO-2016073029 A1 * | 5/2016 | .......... G06F 11/0727 |
| WO | WO-2019116001 A1 * | 6/2019 | ............ G06F 11/203 |

OTHER PUBLICATIONS

Anonymous, "System and method for a owner, file type and directory specific HSM migration policy optimization," IP.com Prior Art Database, Technical Disclosure No. IPCOM000258925D, Jun. 26, 2019, 10 pages.

*Primary Examiner* — Michael Maskulinski
(74) *Attorney, Agent, or Firm* — Zilka-Kotab, P.C.

(57) ABSTRACT

A computer-implemented method according to one embodiment includes receiving, on a first cluster site, extended attributes associated with a first data operation where the first data operation was previously performed on data of a filesystem of second cluster site. In response to a second data operation being performed on data of a filesystem of the first cluster site, extended attributes associated with the second data operation are stored to a predetermined file of the filesystem of the first cluster site. The method further includes outputting, to the second cluster site, the extended attributes stored to the predetermined file of the filesystem of the first cluster site, and in response to a determination that a predefined event has occurred on the second cluster site, using the received extended attributes to fulfill a third data operation.

20 Claims, 12 Drawing Sheets

(51) Int. Cl.
*G06F 16/185* (2019.01)
*G06F 11/14* (2006.01)

(58) Field of Classification Search
CPC ............. G06F 11/1464; G06F 11/1469; G06F 11/201; G06F 11/2033; G06F 11/2064; G06F 11/2094; G06F 11/3006; G06F 16/128; G06F 16/182; G06F 16/183; G06F 16/185
See application file for complete search history.

(56) References Cited

U.S. PATENT DOCUMENTS

2020/0026784 A1  1/2020  Miyoshi et al.
2020/0042229 A1  2/2020  Miyamura et al.

* cited by examiner

EXCHANGING EXTENDED ATTRIBUTES BETWEEN DIFFERENT CLUSTER SITES IN A CLUSTERED FILESYSTEM ENVIRONMENT

BACKGROUND

The present invention relates to clustered filesystems, and more specifically, this invention relates to the exchange of extended attributes between clusters of a clustered filesystem environment.

Filesystems may exist and be shared at more than one physical location where the filesystem is mounted on multiple servers. One specific type of such a shared filesystem includes a clustered filesystem. Clustered filesystems provide several features that facilitate the implementation of highly-available storage environments capable of withstanding catastrophic hardware failures.

In clustered filesystems, it is typical to tier the data into various levels of storage such that data is classified according to priorities, and follow up access patterns when the data is prioritized in persistent storage tiers. In a majority of implementations, automatic policy based data movement occurs between the storage tiers to balance long unused data into the slower data tiers, which may include spinning disks and/or tape drives, so that faster and relatively higher priority data is able to reside in the relatively fastest storage pools, which may include flash arrays or other types of storage mediums.

Data is sometimes also moved to external tiering/backup solutions, e.g., referred to as Hierarchical Storage Management (HSM), where the data may completely reside and the underlying filesystem may keep a reference to the actual data on the HSM servers. HSM servers primarily utilize tape storage in order to adhere to the storage goal of minimizing storage costs.

In clustered filesystems replication capabilities may enable data to be moved from one cluster to another cluster. For example, data may be moved from a data production system, e.g., the production system or a cache, to a data backup site, e.g., a home site or a disaster recovery (DR) site. Moreover, HSM capabilities may be added to either end of a data storage system, e.g., the production end or the backup end, so as to minimize data from being stored on a relatively costlier one of such ends.

SUMMARY

A computer-implemented method according to one embodiment includes receiving, on a first cluster site, extended attributes associated with a first data operation where the first data operation was previously performed on data of a filesystem of second cluster site. In response to a second data operation being performed on data of a filesystem of the first cluster site, extended attributes associated with the second data operation are stored to a predetermined file of the filesystem of the first cluster site. The method further includes outputting, to the second cluster site, the extended attributes stored to the predetermined file of the filesystem of the first cluster site to facilitate matching between extended attributes stored on the second cluster site and the extended attributes stored to the predetermined file of the first cluster site, and in response to a determination that a predefined event has occurred on the second cluster site, using the received extended attributes to fulfill a third data operation.

A computer program product according to another embodiment includes a computer readable storage medium having program instructions embodied therewith. The program instructions are readable and/or executable by a controller to cause the controller to perform the foregoing method.

A system according to another embodiment includes a processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for exchanging extended attributes between clusters of a clustered filesystem environment.

In one general embodiment, a computer-implemented method includes receiving, on a first cluster site, extended attributes associated with a first data operation where the first data operation was previously performed on data of a filesystem of second cluster site. In response to a second data operation being performed on data of a filesystem of the first cluster site, extended attributes associated with the second data operation are stored to a predetermined file of the filesystem of the first cluster site. The method further includes outputting, to the second cluster site, the extended attributes stored to the predetermined file of the filesystem of the first cluster site to facilitate matching between extended attributes stored on the second cluster site and the extended attributes stored to the predetermined file of the first cluster site, and in response to a determination that a predefined event has occurred on the second cluster site, using the received extended attributes to fulfill a third data operation.

In another general embodiment, a computer program product includes a computer readable storage medium having program instructions embodied therewith. The program instructions are readable and/or executable by a controller to cause the controller to perform the foregoing method.

In another general embodiment, a system includes a processor, and logic integrated with the processor, executable by the processor, or integrated with and executable by the processor. The logic is configured to perform the foregoing method.

Figure 1:
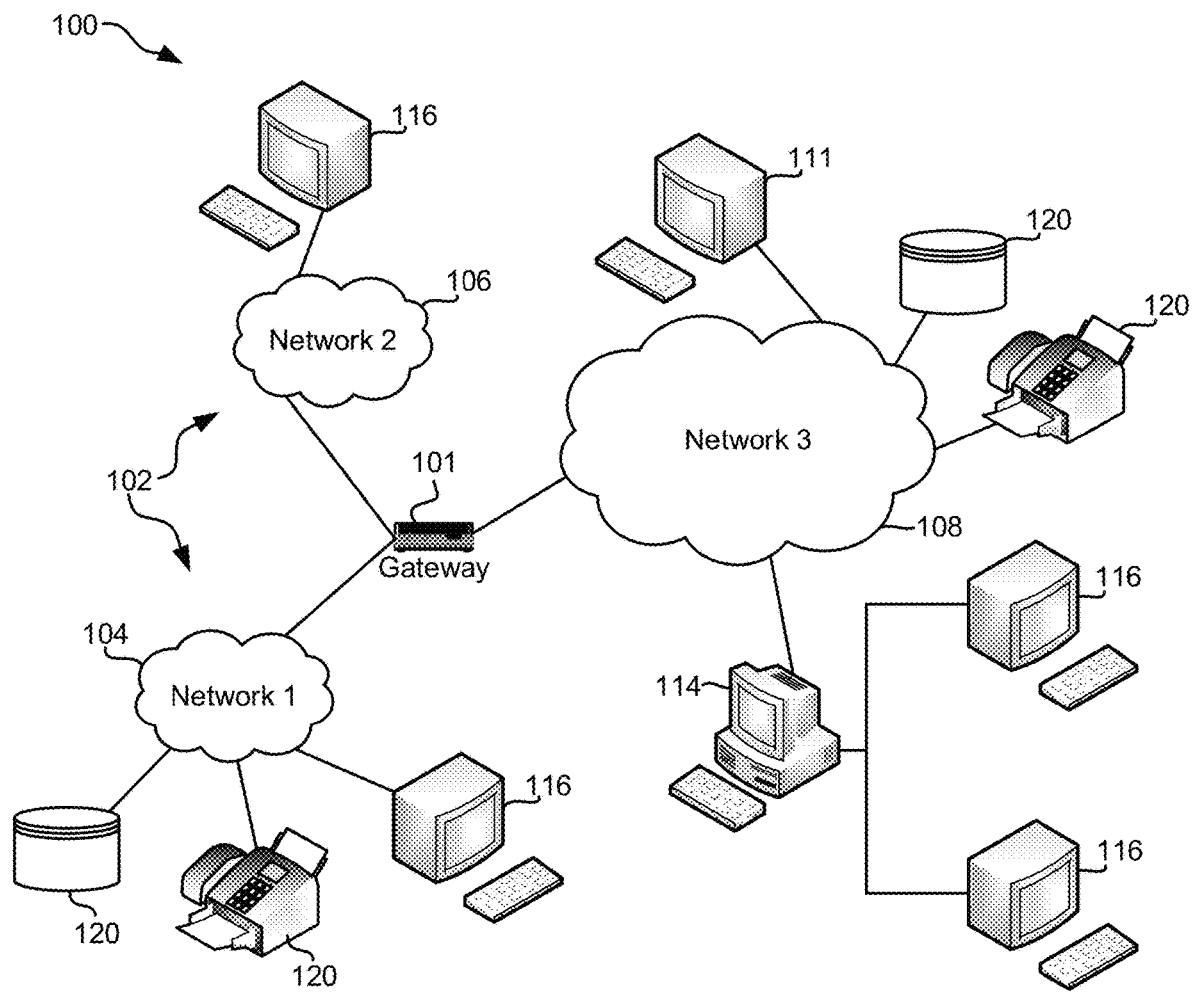
FIG. 1 is a diagram of a network architecture, in accordance with one embodiment of the present invention.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment (IBM and all IBM—based trademarks and logos are trademarks or registered trademarks of International Business Machines Corporation and/or its affiliates), a UNIX® system which virtually hosts a known operating system environment, an operating system which emulates an IBM® z/OS® environment, etc. This virtualization and/or emulation may be enhanced through the use of VMware® software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
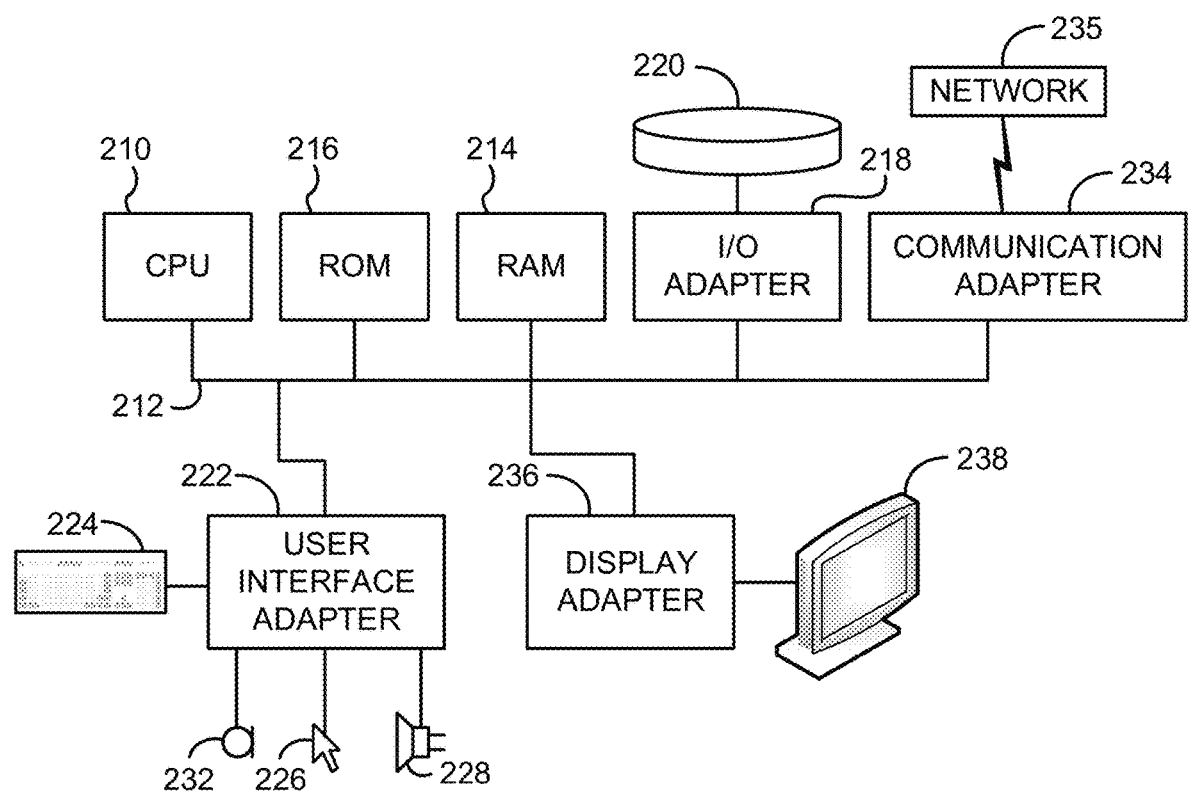
FIG. 2 is a diagram of a representative hardware environment that may be associated with the servers and/or clients of FIG. 1, in accordance with one embodiment of the present invention.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
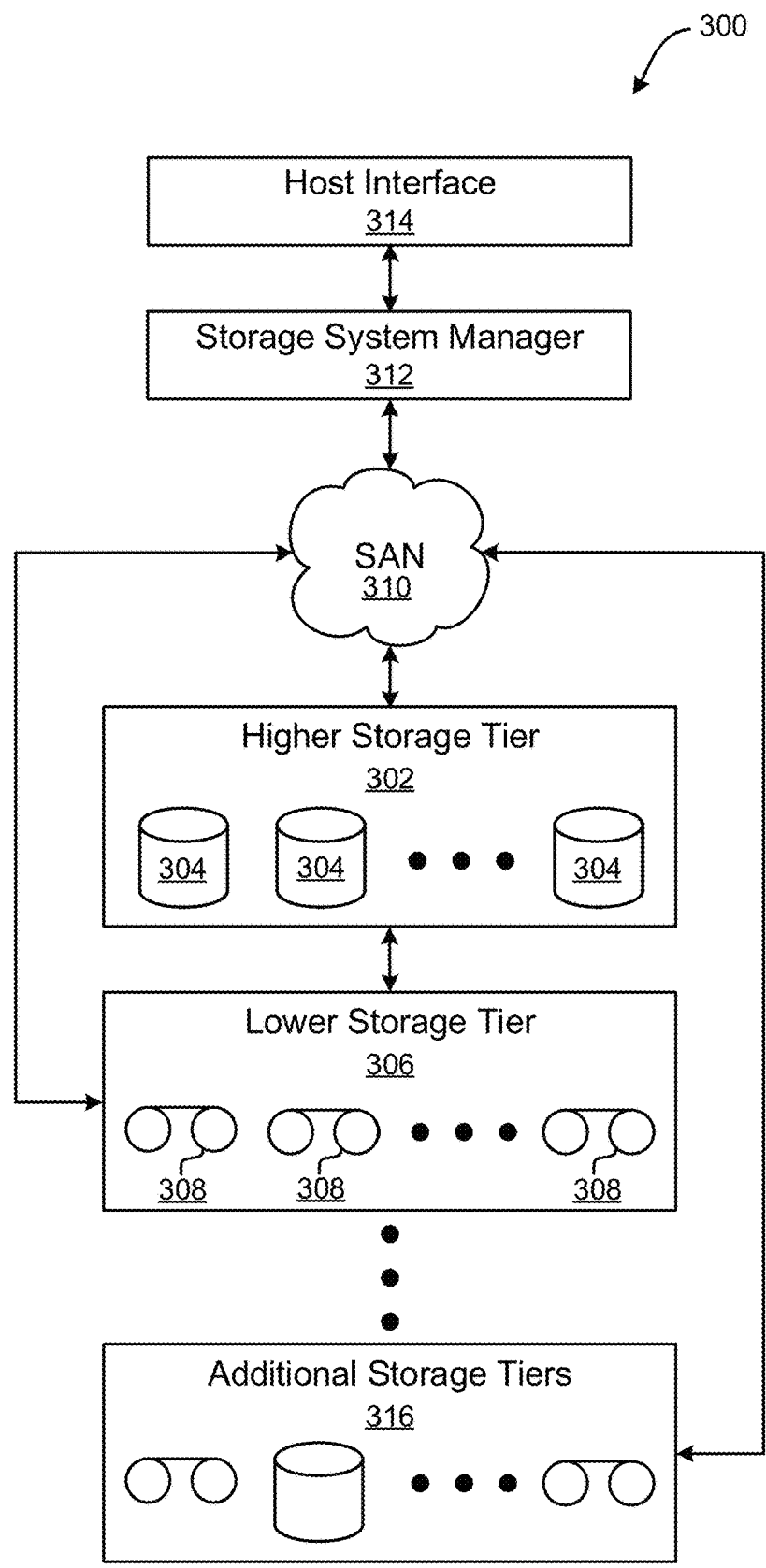
FIG. 3 is a diagram of a tiered data storage system, in accordance with one embodiment of the present invention.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As mentioned elsewhere above, filesystems may exist and be shared at more than one physical location where the filesystem is mounted on multiple servers. One specific type of such a shared filesystem includes a clustered filesystem. Clustered filesystems provide several features that facilitate the implementation of highly-available storage environments capable of withstanding catastrophic hardware failures.

In clustered filesystems, it is typical to tier the data into various levels of storage such that data is classified according to priorities, and follow up access patterns when the data is prioritized in persistent storage tiers. In a majority of implementations, automatic policy based data movement occurs between the storage tiers to balance long unused data into the slower data tiers, which may include spinning disks and/or tape drives, so that faster and relatively higher priority data is able to reside in the relatively fastest storage pools, which may include flash arrays or other types of storage mediums.

Data is sometimes also moved to external tiering/backup solutions, e.g., referred to as Hierarchical Storage Management (HSM), where the data may completely reside and the underlying filesystem may keep a reference to the actual data on the HSM servers. HSM servers primarily utilize tape storage in order to adhere to the storage goal of minimizing storage costs.

In clustered filesystems replication capabilities may enable data to be moved from one cluster to another cluster. For example, data may be moved from a data production system, e.g., the production system or a cache, to a data backup site, e.g., a home site or a disaster recovery (DR) site. Moreover, HSM capabilities may be added to either end of a data storage system, e.g., the production end or the backup end, so as to minimize data from being stored on a relatively costlier one of such ends.

In some conventional implementations, the home cluster site may include HSM capabilities and move data to HSM servers in order to free up space in the home cluster's filesystem. These capabilities however are prone to recall issues. This is because, the cache system may not have, the data that is to be moved, cached. As a result, any accidental checksum or read type of operations that are performed on the file/object at the cache, trigger a read call to the data from the home cluster site. This in turn may first completely recall the data from the HSM servers into the home server, in order for the data to be served to the corresponding cache read call. However, the location of the home cluster site and the location of the cache cluster site could be almost anywhere. For example, such locations may exist on bare metal on premises, or on a cloud-based platform.

For context, a file that is considered for migration typically may be defined in one of three states. Data of a file in a "resident" state may be only available at the filesystem and the data may not yet be moved to HSM. Second, data of a file in a "migrated" state may be completely moved to the HSM and the filesystem may only have a reference to the HSM file from where the file may be recalled. Lastly, data of a file in a "pre-migrated" state may be present at both the HSM and on the filesystem. Here, the file/object on the filesystem has reference back to the data on the HSM, and furthermore the data locally on the filesystem. Such a state occurs when the migrated file is simply recalled/read and causes the migrated data blocks to be fetched back to the filesystem. Various examples in which files are problematically recalled during migration between cluster sites will be described in further detail below.

In a data storage system that includes a cache cluster site and a home cluster site with a HSM server attached to the home cluster site, as data is migrated to magnetic tape of the HSM server, a recalled file may exist in a pre-migrated state at the home cluster site, e.g., where the data has been recalled from HSM, however at the cache, the data may show up as resident, e.g., because it has been fetched as fresh data from the home. This may cause files/objects to have mismatching data management application programming interface (DMAPI) attributes between the cache and its corresponding home counterparts, which compromises performance of the data storage system.

Recall issues are also sometimes experienced in conventional data storage systems that include a HSM server attached to a home cluster site that is in communication with a cache cluster site, where the migrated data is recalled on a read request from cache. In one example the data at the home cluster site may be migrated again, and some lookups that get sent from the cache cluster site to the home cluster site may cause the file to be seen without data blocks at the home cluster site. This causes the cached bit on the file, e.g., the bit that denotes whether the file has been cached or not, to be reset and such files/objects may show up as "OFFLINE" for WINDOWS OS users. This is problematic, because the cache is forced to again fetch actual data from the home in order to appear "ONLINE" for such users.

Performance issues are also experienced in conventional data storage systems having a HSM server attached to a cache cluster site that is in communication with a home cluster site, when data is migrated to tape of the HSM server. This is because the cache is always capable of fetching the DMAPI extended attributes, however, this capability depends on utilization of specific operations such as a prefetch, e.g., a special command to bulk fetch a given list of files from the home over to the cache before the files/objects are actually needed at the cache cluster site. On-demand revalidation operations, e.g., such as lookups, readdirs, getattrs, reads, etc., cannot identify and fetch the DMAPI attributes from the home cluster site because of limitations existing in conventional POSIX calls done over network filesystems (NFSs). Accordingly, there exists an inability to be able to fetch such attributes on demand to reflect the correct DMAPI status at both the cache cluster site and the home cluster site. This is particularly problematic as replication capabilities to cloud and the like increase over time, with a variety of backends such as with the Native Filesystem backend itself as compared to POSIX compliant backends such as the NFS.

Various embodiments and approaches described herein include maintaining updated migration information such as extended attributes between at least two cluster sites in order to maintain operations without hinderance such as a data recall in the event that one of the cluster sites experiences a failure event. Such embodiments and approaches ensure that the operations from a cache that get played to a home cluster site from time to time are able to fetch special DMAPI extended attributes in order to maintain current states between different cluster sites. In some of such embodiments and approaches, the home cluster site is able to understand beyond POSIX compliant calls in order to be able to transfer the special extended attributes from the home cluster site to the cache or vise-versa. In order to be able to do this, the home cluster site may include a special file, e.g., which may be referred to as the control file or CTL file, which may be similar to any other file in the filesystem, except for the fact that when an I/O operation is performed on the file via NFS/Native Filesystem backends, the I/O on the file is interpreted as filesystem specific administrative commands at the remote site. This intelligence is preferably realized by both the cache cluster site and the home cluster site. For example, the cache cluster site may be aware on which offset to write to and what data size to write to. Moreover, the home cluster site may be configured to associate a received I/O on that given offset for a given chunk size of data, with an operation.

For the case under consideration, the I/O request on the control file preferably results in the home site returning the DMAPI extended attribute. This may be performed as part of one or more operations, and preferably all operations including, e.g., lookup, readdir, open, getattr, etc., that the cache performs with the home cluster site in order to ensure that the cache is updated with what is and has occurred at the home cluster site.

A special read call operation may be implemented such that when a read at a predetermined offset for a predetermined sized chunk is requested on the control file from the cache, the requested DMAPI attributes on the given inode is returned to cache as regular data chunks. Such chunks may be interpreted by the cache as extended attributes denoting the DMAPI location of the inode, and thereby set the same on the cache inode counterpart.

Moreover, the DMAPI attributes need not be queried as part of the predetermined calls, e.g., lookup, open, getattr, readdir, etc., each time. This is because some cases may not have a HSM association, and in such cases, it may be counterproductive to performance to otherwise unnecessarily utilize cycles to query for attributes that do not exist. Accordingly, in such cases, a tunable may implemented that can be turned on and off based depending on which of the calls, e.g., lookup, open, getattr, readdir, etc., calls are executed, where at least some of such calls determine whether a query for the DMAPI extended attributes is to be performed.

Figure 4:
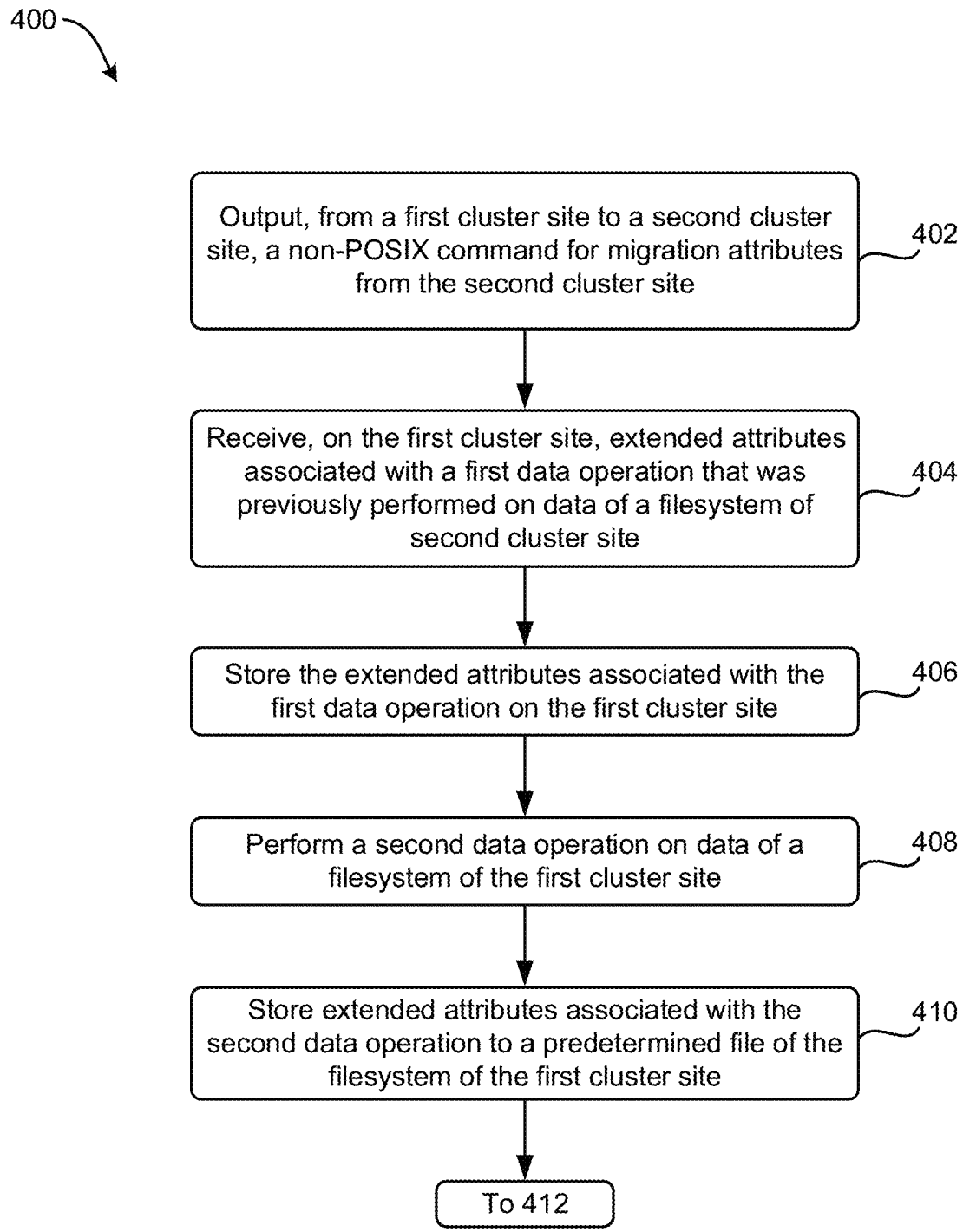
FIG. 4 is a flowchart of a method, in accordance with one embodiment.
Figure 4:
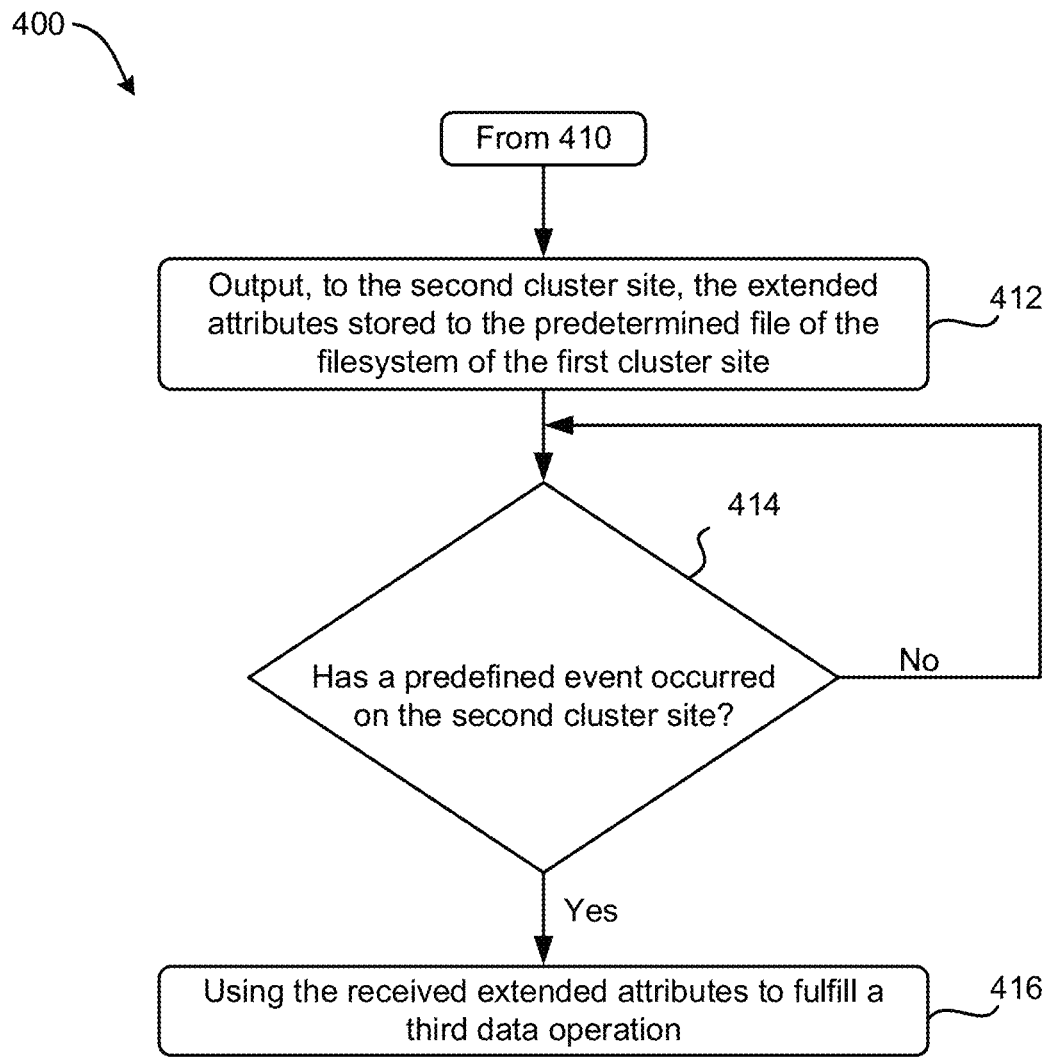

Now referring to FIG. 4, a flowchart of a method 400 is shown according to one embodiment. The method 400 may be performed in accordance with the present invention in any of the environments depicted in FIGS. 1-3 and 5-11, among others, in various embodiments. Of course, more or fewer operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a computer, a controller, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

Method 400 may include outputting, from a first cluster site to a second cluster site, a query for current extended attributes of the second cluster site. For example, optional operation 402 of method 400 includes outputting, from a first cluster site to a second cluster site, a predetermined non-POSIX command for migration attributes, e.g., hereafter referred in method 400 as "extended attributes," from the second cluster site. The non-POSIX command may be an I/O request on a predetermined file of a filesystem of the second cluster site, e.g., a control file. In some approaches the non-POSIX command may be an operation that is sometimes performed between the first cluster site and the second cluster site, e.g., lookup, open, getattr, readdir, etc.

This way, the first cluster site may be kept updated with data operations that occur on the second cluster site that may otherwise result in the first cluster site and the second cluster site having mismatched migration states of the same entry of data. Moreover, depending on the approach, the first cluster site and the second cluster site may include a common filesystem, or the first cluster site may include a filesystem that is different from a filesystem of the second cluster site. For purposes of an example, communications between the first cluster site and the second cluster site may occur over a NFS backend, and/or a known type of cluster site communication medium.

In some approaches the first cluster site may be an edge cache and/or a new production cluster and the second cluster site may be a consolidated data site and/or an old production cluster site, e.g., older than the first cluster site. In contrast, in some other approaches, the first cluster site may be a consolidated data site and/or an old production cluster site, e.g., older than the second cluster site, and the second cluster site may be an edge cache and/or a new production cluster. Moreover, depending on the approach, the first cluster site and/or the second cluster site may be connected to an HSM server, which in some approaches may include a plurality of tape drives.

The extended attributes of may depend on the approach, e.g., such as metadata of a file stored on the first cluster site and/or the second cluster site, filehandle, remote inode mtime, ctime, inode numbers of entities that were mounted during a data operation performed on data of a filesystem of the second cluster site, DMAPI extended attributes, etc. Moreover, the extended attributes requested by the first cluster site from the second cluster site may be associated with a data operation previously performed or alternatively scheduled to be performed on data of a filesystem of the second cluster site, e.g., a first data operation. For context, in various approaches described herein, cluster sites may request extended attributes from another cluster site, e.g., here the first cluster site requests extended attributes from the second cluster site, in order to prevent recalls from occurring in the event of a disaster event. More specifically, as will be described in greater detail elsewhere herein, in the event of a disaster event, based on a cluster site having current extended attributes of another cluster site that becomes non-functional, e.g., non-operational, during a disaster event, the cluster site is enabled to continue operations for the non-functional cluster site without needing to recall data from the non-functional cluster site to do so.

It should be noted that operation 402 is described in the current embodiment to be an optional operation, because the migration attributes may alternatively be received by the first cluster site from the second cluster site without the first cluster site requesting the attributes. In some other approaches, a query output from the first cluster site to the second cluster site for current extended attributes of the second cluster site may be output with one or more flags. For example, in one of such approaches, the presence of a flag in the query may indicative that the query includes a request for extended attributes, while queries output from the first cluster site to the second cluster site, or vise-versa, for information other than extended attributes may not be output with the flag. Such flags may reduce an amount of processing that is otherwise utilized in exchanging extended attributes between cluster sites, provided that at least one processor of the first cluster site is configured to associate a flag with a request for extended attributes and/or at least one processor of the second cluster site is configured to associate a flag with a request for extended attributes.

In some approaches, a special read call may be implemented such that when a read at a certain offset for a certain sized data chunk is output by the first cluster site and received on the control file of the second cluster site, requested DMAPI attributes on a given inode are returned to the first cluster site as regular data chunks. This may be interpreted by the first cluster site as extended attributes denoting the DMAPI location of the inode and thereby set the same on the first cluster site inode counterpart. For example, operation 404 includes receiving, on the first cluster site, extended attributes associated with the first data operation. In some approaches, the extended attributes may not be queried as part of calls, e.g., lookup, open, getattr, readdir, etc., each time that such operations are performed. This is because in some approaches, the calls may not have a HSM association, and in such cases otherwise querying for the extended attributes may be considered a wasted cycle if the extended attributes do not exist. Accordingly, in some approaches, method 400 may implement a tunable that may be turned on/off, such as by a user, based on which of the calls, e.g., lookup, open, getattr, readdir, etc., are configured to determine whether or not a query for the DMAPI extended attribute is performed.

In some approaches, the extended attributes may be encrypted by the second cluster site prior to being received by the first cluster site, e.g., using a key or formatting standard that is known to the first cluster site for purposes of decryption. In some approaches, the extended attributes may be received with other data that was scheduled to be output from the second cluster site to the first cluster site. In some other approaches, the extended attributes may be received by the first cluster site without any other information from the second cluster site.

The extended attributes may be stored on the first cluster site, e.g., see operation 406. The extended attributes are preferably stored to a predetermined file, e.g., a control file, that is designated for storing extended attributes, e.g., of the first cluster site, of the second cluster site, of other cluster sites, or any combination thereof. The predetermined file may be similar to any other file in the filesystem, except that when one or more predetermined I/O operations are performed on the file via NFS/native filesystem backends, the I/O on the file is interpreted as filesystem specific administrative commands at the remote site. This intelligence is preferably realized by both the first cluster site and the second cluster site to thereby allow extended attributes to be exchanged between the cluster sites. For example, the first cluster site may be aware of which offset to write to and what data size to write to. Moreover, the second cluster site may be configured to associate a received I/O on that given offset for a given chunk size of data, with a predetermined operation. In some approaches, storing the extended attributes to the predetermined file may include replacing, e.g., such as by overwriting, previous extended attributes that are considered outdated based on receiving the extended attributes in operation 404.

Operation 408 includes performing a data operation on data of a filesystem of the first cluster site, e.g., a second data operation. In some approaches, the data operation may be a known type of data operation that results in a migration state of data of the filesystem of the first cluster site changing. In response the second data operation being performed by the first cluster site on data of the filesystem of the first cluster site, extended attributes associated with the second data operation are stored to a predetermined file of the filesystem of the first cluster site, e.g., see operation 410. For context, the extended attributes associated with the second data operation may be stored to the predetermined file of the filesystem of the first cluster site for thereafter providing the extended attributes to another cluster site, such as the second site, that may fulfill one or more data operations for the first cluster site in the event that the first cluster site becomes non-functional, e.g., during a disaster event, during a scheduled updating of the first cluster site, etc. Note that the predetermined file of the filesystem of the first cluster site to which the extended attributes associated with the second data operation are stored may in some approaches be the same file that the extended attributes received from the second cluster system are stored to, e.g., see operation 406. In some other approaches, the predetermined file of the filesystem of the first cluster site to which the extended attributes associated with the second data operation are stored may in some approaches be different that the file that the extended attributes received from the second cluster system are stored to, e.g., see operation 406.

The extended attributes stored to the predetermined file of the filesystem of the first cluster site are output to the second cluster site, e.g., see operation 412. The outputting of the extended attributes to the second cluster site may facilitate matching between extended attributes stored on the second cluster site and the extended attributes stored to the predetermined file of the first cluster site.

As will now be described in various approaches below, the matching of extended attributes stored on the first cluster site and stored on the second cluster site enables the clustered filesystem environment to be dynamically adjusted to prevent one or more events from compromising performance of the clustered filesystem environment. This way, in response to a determination that one or more predefined events have occurred on one of the clustered sites, e.g., such as a failure event on the second cluster site, another of the clustered sites may use the stored extended attributes to maintain functionality of I/O operations.

Decision 414 includes determining whether a predefined event has occurred on the second cluster site. In some approaches, in response to a determination that a predefined event has not occurred on the second cluster site, e.g., as illustrated by the "No" logical path of decision 414, monitoring may continue to be performed for occurrence of one or more predefined events. In another approach, in response to a determination that a data operation has been performed on data of the filesystem of the second cluster site, e.g., a data operation that is capable of changing the extended attributes, method 400 may include outputting, from the first cluster site to a second cluster site, the non-POSIX command for migration attributes from the second cluster site, e.g., to enable an updating of the extended attributes stored on the predetermined file of the first cluster site.

In some other approaches, in response to a determination that a predefined event has occurred on the second cluster site, e.g., as illustrated by the "Yes" logical path of decision 414, method 400 may additionally and/or alternatively include using the received extended attributes to fulfill a data operation, such as a third data operation, e.g., see operation 416. For example, in some approaches, the predefined event may be a scheduled downtime of one of the cluster sites, e.g., for updating. In some other approaches, the predefined event may be a failure event of one of the cluster sites. According to a more specific approach, the predefined event may be a failure event of the second cluster site. Based on extended attributes of the second cluster site being stored on the first cluster site, the first cluster site may fulfill one or more data operations for the second cluster site, e.g., such as to act on behalf of the second cluster site during at least some of the time that the second cluster site is impacted by the failure event. For example, in some approaches the first cluster site may be a backup destination of the second cluster site. More specifically, in one or more of such approaches, the first cluster site and the second cluster site be included in a HSM enabled multi-cluster replication environment. Fulfilling the third data operation in such approaches may include allowing an application to perform a data operation on the first cluster site, e.g., such a data migration operation in which data is migrated from the first cluster site to a hierarchical storage management system connected to the first cluster site, where the data operation was previously scheduled to be performed by the application on the second cluster site, e.g., the scheduled operation is interrupted by the occurrence of the failure event that results in the second cluster site being at least temporarily non-functional. In another approach, the third data operation may additionally and/or alternatively include performing received write requests. The first cluster site may store extended attributes associated with the first cluster site fulfilling data operations for the second cluster site. Known techniques may be performed to recover the second cluster site from the predefined event, e.g., such as where the predefined event is a failure event of the second cluster site.

Method 400 may include performing a failback operation in response to a determination that the second cluster site has recovered from the failure event, e.g., regained an operational and/or a functional status. In one approach the failback operation includes outputting the extended attributes associated with the first cluster site fulfilling one or more data operations in response to the determination that the predefined event has occurred on the second cluster site. For example, in some approaches in which the third data operation is a data migration operation, performing the failback operation may include outputting, from the first cluster site to the second cluster site, the extended attributes of entries of data migrated during the data migration operation by the first cluster site. The extended attributes are preferably output to the second cluster site and/or another cluster site in order to update extended attributes of other cluster sites and/or the migration states of data stored on the cluster sites that receive the extended attributes, e.g., such as cluster sites that may fulfill data operations for the first cluster site in the event that the first cluster site experiences a failure event.

It should be noted that the failback operation preferably does not include migrating data associated with the data operation performed by the first cluster site for the second cluster site other than the extended attributes to the second cluster site. For context, in some approaches, data is not migrated from the second cluster site to the first cluster site, because the first cluster site is enabled to determine a migration state of data on the second cluster site using the extended attributes received from the second cluster site. More specifically, the first cluster site does not unnecessarily recall data from the second cluster site based on otherwise having an inaccurate determination of the state of data within the replication environment. For example, it may be assumed that a second cluster site of a replication-based clustered filesystem environment has migrated an extent of data to an HSM server prior to the second cluster experiencing a failure event, e.g., thereby placing the data in the migrated state. Provided that extended attributes that may be used to determine the current migration state of the extent of data are received by the first cluster site, the first cluster site may connect to the HSM server during the failure event and thereafter use the received extended attributes to access the extent of data on the HSM server rather than recalling the data from the second cluster site. It should be noted that the first cluster site otherwise attempting to recall the data from the second cluster site would result in a wasted cycle, as the data no longer exists on the second cluster site once the data is in the migrated state. Accordingly, cycles are preserved, and unnecessary data recalls are avoided as a result of the techniques described in various embodiments and approaches described herein. Moreover, the location at which the extent of data is to be read on the HSM server by the first cluster site is known, e.g., to an application of the first cluster site, based on the received extended attributes. Accordingly, the first cluster site does not have to wait for the second cluster site to recover from the failure event to determine the location on the HSM server at which to read the extent of data. In some other approaches a nominal or minimal amount of recalls/migrates and/or a minimal data movement may occur between the clusters during fulfillment of the data operation of the second cluster site by the first cluster site and/or during the failback operation. For example, where a portion of an extent of data exists on the HSM server and another portion of the extent of data exists on the second cluster site, the received extended attributes may be used to determine what portion of the extent of data is accessible by the first cluster site on the HSM server during the disaster event and what portion of the extent of data may be accessed by the first cluster site from the second cluster site after the second cluster site recovers from the failure event.

According to another example, assuming that the second cluster site is connected to a hierarchical storage management system prior to the failure event of the second cluster site, in response to a determination that a failure event has occurred on the second cluster site, method 400 may include instructing the first cluster site to connect to the hierarchical storage management system during the failure event to enable fulfillment of the third data operation by the first cluster site, e.g., enabled based on the first cluster site having the extended attributes from the second cluster site. Subsequent to the second cluster site recovering from the failure event, method 400 may include outputting, from the first cluster site to the second cluster site, extended attributes associated with data operation(s) performed by the first cluster site while the second cluster site was non-functional as a result of the failure event and/or while the first cluster site was connected to the hierarchical storage management system. The second cluster site may additionally and/or alternatively be reconnected to the hierarchical storage management system and/or update extended attributes stored on a predetermined file of the second cluster site, e.g., a control file, with extended attributes from the first cluster site, subsequent to recovering from the failure event.

In some clustered filesystem environments in which various techniques of method 400 are implemented, the second cluster site may be a home cluster site that is connected to a hierarchical storage management system, and the first cluster site may be a cache cluster site. A migration process may at some point be performed for replacing the home cluster site with the cache cluster site. In one preferred approach, the migration process preferably includes storing, on the first cluster site, extended attributes received from the second site and connecting the hierarchical storage management system to the new cluster site. More specifically, the migration process may include storing, on the first cluster site, the extended attributes associated with a data operation performed on the second cluster stie, and connecting the first cluster site to the hierarchical storage management system. Accordingly, in one approach, the predefined event of decision 414 may be the second cluster site disconnecting from the hierarchical storage management system, e.g., in response to detecting that the second cluster site has disconnected from the hierarchical storage management system. In such an approach, in response to a determination that the second cluster site has disconnected from the hierarchical storage management system, the first cluster site may perform a data operation using extended attributes received from the second cluster site. The migration process may additionally and/or alternatively include using the extended attributes to modify a current migration state of an entry of data that is stored on the hierarchical storage management system. This modification may result in a current migration state of a first extent of data on the first cluster site to match with a current migration state of a second extent of data on the second cluster site. Note that the first extent of data and the second extent of data may be pre-associated with one another, e.g., replicated copies of data in a multi-cluster replication environment.

The migration process in some preferred approaches does not include migrating data of the filesystem of the second cluster site from the home cluster site to the cache cluster site and/or preferably does not include migrating data from the hierarchical storage management system to the first cluster site through the second cluster site, e.g., other than the extended attributes, other than acknowledgements, other than confirmations, other than nominal amounts of data, etc., because instead, the first cluster site is able to connect to the hierarchical storage management system and take over operations for the second cluster site based on the first cluster site having the extended attributes from the second cluster site. This process may be particularly applicable where the first cluster site is a relatively newer cluster site that replaces the second cluster site which is a relatively older cluster site. It should be noted that an application operating on the first cluster site before completion of the migration process preferably does not result in a recall of data from the second cluster site being triggered. Accordingly, the migration process does not include migrating the data from the home cluster site to the cache cluster site but instead providing the cache cluster site with the extended attributes to use with the hierarchical storage management system.

In some approaches, if a tunable to verify and fetch DMAPI extended attributes is set at the first cluster site, then the operation, e.g., lookup, open, getattr, readdir, etc., preferably makes the special read request on a control file interface for the DMAPI extended attributes on the inode of interest from the second cluster site. The second cluster site preferably in turn returns the DMAPI attributes as part of the cache's operations, e.g., lookup, open, getattr, readdir, etc., that validate the inode with the second cluster site. In some approaches, as will now be described below, upon receipt and setting of the DMAPI attributes on the cache inode, the cache may operate in order to transition between migration states.

In one example, assuming that the file is migrated to the HSM server from a resident state at either of the sites, e.g., in this case the cache/home had data blocks first that the opposite site had taken as read/write, it may be considered how the other of the sites will handle this. More specifically, a pure reader approach may first be considered in which the cache only fetches data from home to cache. In such an approach, if the home migrates a previously resident inode, then the lookup class operations from the cache, e.g., using a DMAPI attribute fetch, preferably fetch the DMAPI extended attributes and set it on the cache file. Moreover, upon realizing that there are no data blocks on the home file, the cache file also preferably releases the data blocks and reflects the migrated state. In some approaches, the only difference between the home migrated stub and the cache's reflect migrated stub is that, when a read is issued on the home stub, data of the inode is directly recalled from the HSM server. The home cluster site may not be able do this, unless the same HSM server is connected at both the cache cluster site and the home cluster site, thereby giving the cache cluster site equal credentials as the home cluster site, e.g., the credential of the cache cluster site allows for the cache cluster site to complete on par data movement to and from the HSM as the credential that the home cluster site allows for, e.g., see FIG. 6. According to another specific approach, the cache cluster site being the sole writer of data and the home cluster site being merely a backup site may also be considered. In this case if the cache cluster site tries to migrate a resident file to its own HSM server, then a setAttr operation is preferably queued to the home site. This may set the given DMAPI extended attributes from the cache cluster site and also initiate the home file to release data blocks stored on the home file such that the migrated state is clearly reflected at the home cluster site as well, e.g., see FIG. 7.

According to another approach, another way that the cache may operate in order to transition between migration states may be based on whether the file is recalled from the HSM server from a migrated state, and at either of these sites, how the other site handles such, e.g., in this case the cache/home does not have data blocks firstly, that is also reflected to the opposite site by transferring the DMAPI attributes and releasing the data blocks, at either of the sites. For example, a pure reader case may be considered, where the cache only fetches data from home to cache. In this case, if the home recalls the data, e.g., for sake of a readonly, then the data at home is in the pre-migrated state, e.g., it is both present on disk on the filesystem and on the HSM server, and the lookup class operations from the cache, e.g., with DMAPI attrs fetch, preferably fetch the data blocks over to the cache cluster site from home file. Because in this case the cache counterpart preferably keeps both on disk data and the DMAPI extended attributes, it is seen as pre-migrated at both sites, e.g., see FIG. 8. In another example, the cache may be the sole writer of data and the home may merely be a backup site. In this case, in the event that the cache tries to recall the data, the migration status may be set as pre-migrated at the cache. Moreover, the cache may queue up a write of the recalled data blocks to the home, thereby playing data to the other site, and also causing it to adopt a pre-migrated state, e.g., to have on disk data blocks and a set of DMAPI extended attributes denoting the presence of data on HSM, e.g., see FIG. 9.

According to yet another approach, another way that the cache may behave in order to transition between migration states may be based on whether the file takes up data changes when it is either in a pre-migrated or in a migrated state, and at either of the sites how the other site handle such. It should be noted that data changes on a migrated/pre-migrated file may make it completely resident. First the file is recalled from the HSM server back to disk, and removed on the HSM Server. In doing so the DMAPI attributes that are set on the file are preferably also removed. In some approaches, only once this happens can the file be completely resident and be allowed to be modified.

In some approaches, a pure reader case may be considered in which the cache only fetches data from home to cache. In this case, if the home had a migrated file which became resident because of the write class operation on the file, then a lookup class operation from the cache that gets triggered on-demand access of the file's cache counterpart, e.g., with DMAPI attrs fetch, preferably fetches the whole file with modified data blocks, and in the process, removes the DMAPI attrs that are set on the cache file as well. This way, both the cache and home files become resident on disk. In contrast, assuming that the home cluster site has a pre-migrated file which becomes resident because of the write operation, a lookup class operation from the cache that gets triggered by on-demand access of the file's cache counterpart, e.g., with DMAPI attrs fetch, preferably fetches just the changed blocks between the data on disk on the cache and home files. Moreover, in the process the DMAPI attrs that are set on the cache file may be removed as well. This way, both the cache and home files become resident on disk, e.g., see FIG. 10.

Some other approaches may be based on the cache being the sole writer of data and the home merely being a backup site. For example, in one approach, if the cache has migrated file which has become resident because of the write, then the cache preferably queues a complete file write from the cache back to home. This may ensure that all data blocks make it from cache to home, and in the process also remove the DMAPI attrs that are set on the home file. This way, both the cache and home files become resident on disk. In another of such approaches, if the cache has a pre-migrated file which has become resident because of the write operation, then the delta of the write that occurred on the cache file may be the only set of operations that are queued to be played at the home and in the process, the DMAPI attrs that are set on the home file may be removed. This way, both the cache and home files become resident on disk, e.g., see FIG. 11.

It should be noted that matching of extended attributes between cluster sites and/or migration states, as well as using the extended attributes thereafter in the event that a predetermined operation occurs, e.g., such as a disaster event, have heretofore not been considered in conventional clustered filesystem environments. Instead, performance of conventional clustered filesystems is compromised as a result of conventional migration techniques allowing a recalled file to exist in a pre-migrated state at a home cluster site and resident at a cluster site. Various conventional migration techniques that result in unnecessary data recalls as a result of mismatched extended attributes and/or migration states at different cluster sites. In sharp contrast, various embodiments and approaches described herein include maintaining updated migration information such as extended attributes and/or migration states between at least two cluster sites in order to maintain operations without hinderance, e.g., such as a data recall in the event that one of the cluster sites experiences a failure event. This results in preserved processing resources in clustered filesystem environment throughout data migration and particularly during failure events, as a cluster site is enabled to take over for at least one other cluster sites as a result of the cluster site having extended attributes of the at least one other cluster site stored in a predetermined file of a filesystem of the cluster site. Accordingly, the inventive discoveries disclosed herein with regards to use of matching extended attributes and/or migration states between different cluster sites in a clustered filesystem environment proceed contrary to conventional wisdom.

Illustrative embodiments of clustered filesystem environments that include various techniques similar to those described elsewhere herein in method 400 will now be described below.

Figure 5:
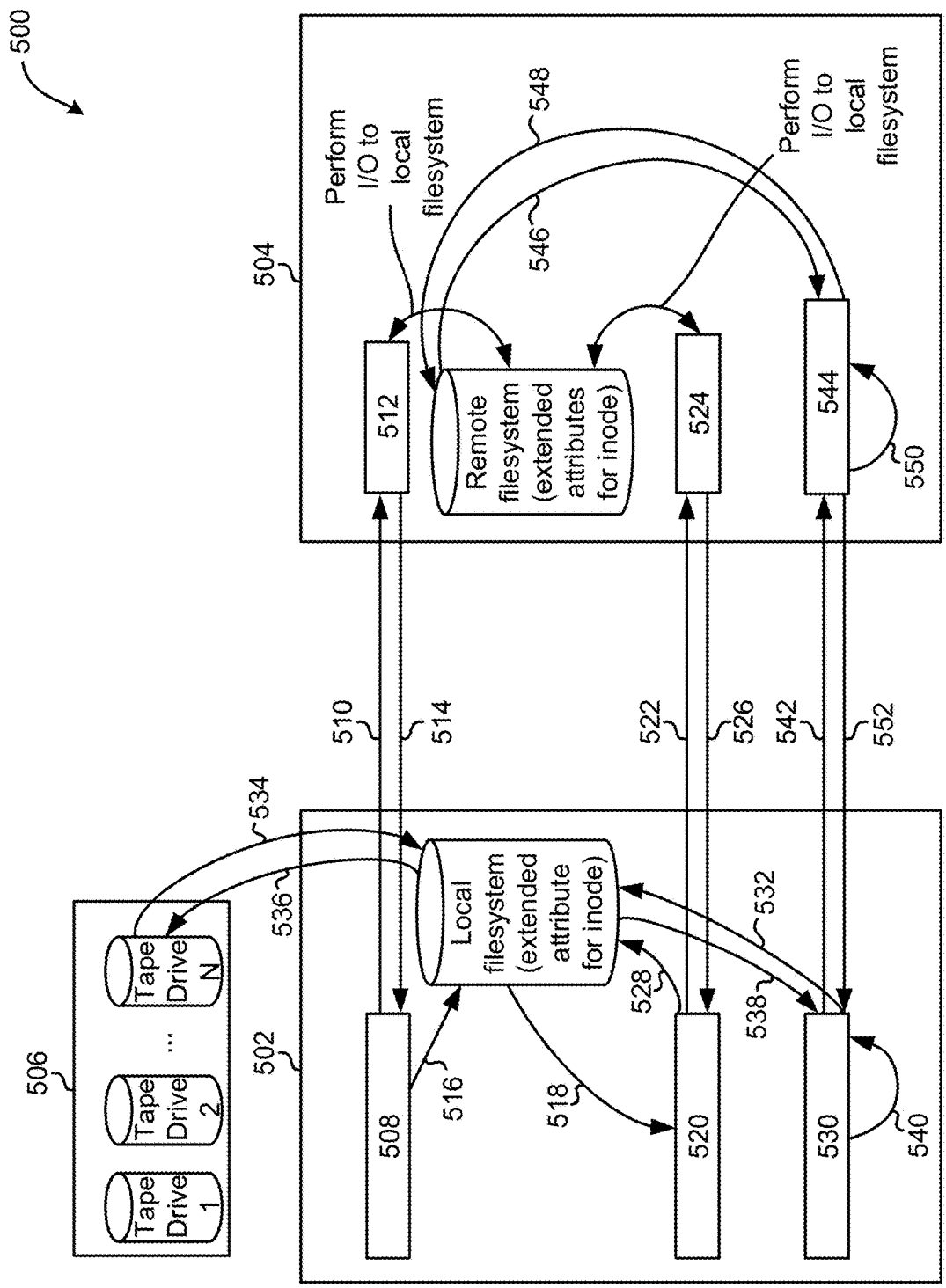
FIG. 5 is a clustered filesystem environment, in accordance with one embodiment.

FIG. 5 depicts a clustered filesystem environment 500, in accordance with one embodiment. As an option, the present environment 500 may be implemented in conjunction with features from any other embodiment listed herein, such as those described with reference to the other FIGS. Of course, however, such environment 500 and others presented herein may be used in various applications and/or in permutations which may or may not be specifically described in the illustrative embodiments listed herein. Further, the environment 500 presented herein may be used in any desired environment.

In FIG. 5, various communications exchanged between a first cluster site 502, e.g., a cache cluster in the current example, and a second cluster site 504, e.g., a home cluster in the current example, of the clustered filesystem environment 500, and various operations performed by the cluster sites 502, 504 are illustrated in accordance with one embodiment. Moreover, environment 500 illustrates a file being migrated from the first cluster site 502 to the HSM server 506, and the file also being replicated to the home cluster site 504 at part of the replication. In some approaches, the first cluster site 502 may be an edge cache and/or a new production cluster. Moreover, in some approaches the second cluster site 504 may be a consolidated data site and/or an old production cluster, e.g., older than the first cluster site 502. The first cluster site 502 is connected to a HSM server 506 that includes a plurality of tape drives e.g., see Tape Drive 1-Tape Drive N.

Operation 508 includes performing a create operation for a file, e.g., testFile.

Operation 510 includes outputting a create operation, e.g., testFile, to a remote site, e.g., the second cluster site 504.

Operation 512 includes creating the file, e.g., testFile, on the second cluster site 504.

In operation 514, an acknowledgement is returned with a remote attribute of the request.

Operation 516 includes storing the remote attributes, e.g., for the filehandle, remote inode mtime, ctime, etc., on the first cluster site 502.

Operation 518 includes retrieving the remote attributes for writing.

Operation 520 includes generating a write operation on the same file, e.g., testFile.

Operation 522 includes performing the write operation using the file handle.

Operation 524 includes writing on the file, e.g., testFile.

Operation 526 includes returning acknowledgement of a successful write, e.g., with updated remote attributes.

Operation 528 includes updating the remote attributes stored on the first cluster site 502.

Operation 530 includes migrating the file's, e.g., testFile, data to the HSM server 506.

Operation 532 includes migrating a request to move data blocks from the local filesystem to the HSM server 506.

Operation 534 includes moving the actual data blocks from the local filesystem over to the HSM server 506, e.g., tape drives.

Operation 536 includes returning an acknowledgement that the HSM server 506 with data locations on the tapes. Moreover, local filesystem inode subs are updated with the HSM data location for later recalls.

Operation 538 includes acknowledging the migrate request.

Operation 540 includes moving the files to a migrated state.

Operation 542 includes updating the DMAPI stubs to the second cluster site 504 provided the availability of a special control file and if a configuration to keep DMAPI attributes in sync is turned on.

Operation 544 includes simulating a complete migrated state for the file.

Operation 546 includes releasing local data blocks of the file and updating the DMAPI stub attributes received from the first cluster site 502.

Operation 548 includes acknowledging removal of local data clocks and setting of DMAPI stub attributes.

In operation 550 the files are moved to the migrated state.

In operation 552 an acknowledgement of the update of attributes is received by the first cluster site 502.

Figure 6:
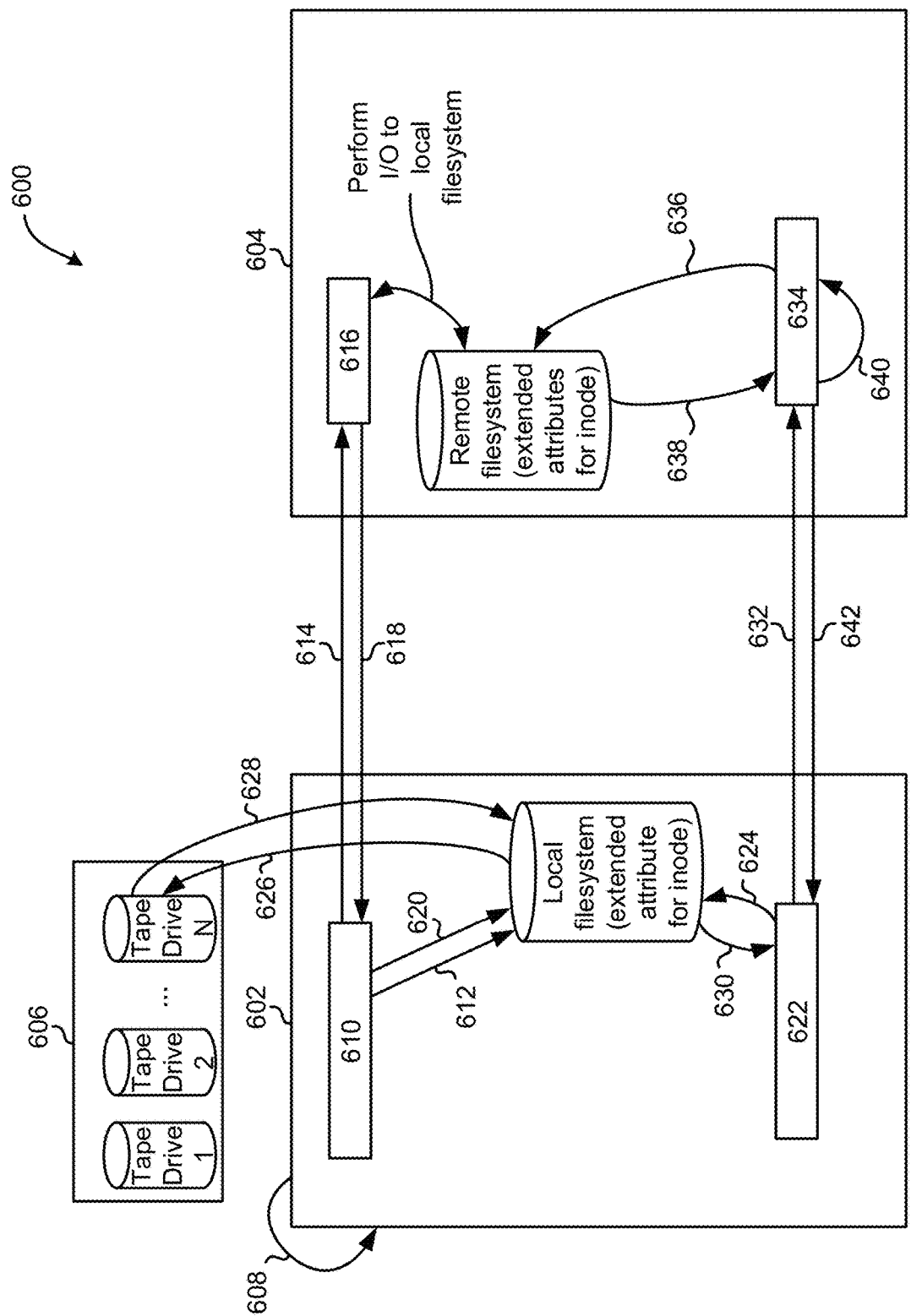
FIG. 6 is a clustered filesystem environment, in accordance with one embodiment.

FIG. 6 depicts a clustered filesystem environment 600, in accordance with one embodiment. As an option, the present environment 600 may be implemented in conjunction with features from any other embodiment listed herein, such as those described with reference to the other FIGS. Of course, however, such environment 600 and others presented herein may be used in various applications and/or in permutations which may or may not be specifically described in the illustrative embodiments listed herein. Further, the environment 600 presented herein may be used in any desired environment.

In FIG. 6, various communications exchanged between a first cluster site 602, e.g., a cache cluster in the current example, and a second cluster site 604, e.g., a home cluster in the current example, of the clustered filesystem environment 600, and various operations performed by the cluster sites 602, 604 are illustrated in accordance with one embodiment. Moreover, a HSM server 606 is attached to the cache cluster site 602 and the DMAPI stub is only synced to the home cluster site 604 without recalling the migrated data. In some approaches, the first cluster site 602 may be an edge cache and/or a new production cluster. Moreover, in some approaches the second cluster site 604 may be a consolidated data site and/or an old production cluster, e.g., older than the first cluster site 602. The first cluster site 602 is connected to the HSM server 606 that includes a plurality of tape drives e.g., see Tape Drive 1-Tape Drive N.

In operation 608 a recovery of missed replication or complete resynchronization of all cache files to home is triggered.

Because no data has changed on the file, e.g., testFile, no recall is performed. Instead, an update of DMAPI attributes to the home cluster site 602 is performed, e.g., see operation 610.

Operation 612 includes retrieving the remote attributes for writing.

Operation 614 includes updating the latest DMAPI attributes on the file, e.g., via an outputting of the attributes to the second cluster site 604.

Operation 616 includes updating the DMAPI attributes to disk on the file, e.g., testFile.

Operation 618 includes receiving the acknowledgement with the latest remote attributes from the second cluster site 604.

Operation 620 includes updating remote attributes for the file, e.g., filehandle, remote inode mtime, ctime, etc.

In operation 622, a choice to migrate the file's data to the HSM server 606 again, e.g., testFile, may be made.

Operation 624 includes migrating a request to move data blocks from the local filesystem to the HSM server 606.

Operation 626 includes moving actual data clocks from the local filesystem over to the HSM server 606, e.g., tape drives.

Operation 628 includes receiving an acknowledgement from the HSM server 606 with data location on the tapes. An update to the local filesystem inode stubs with the HSM server data locations may be made for later recalls.

Operation 630 includes acknowledging the migrate request.

Operation 632 includes performing an DMAPI attribute update using the file handle.

Operation 634 includes simulating a complete migrated status for the file.

Operation 636 includes acknowledging removal of local data blocks and setting of DMAPI stub attributes.

In operation 638 an acknowledgment of removal of local data blocks and setting of DMAPI stub attributes is generated.

In operation 640 the file moves to the migrated state.

In operation 642 an acknowledgment of an updating of the attributes is received at the cache cluster site 602.

Figure 7:
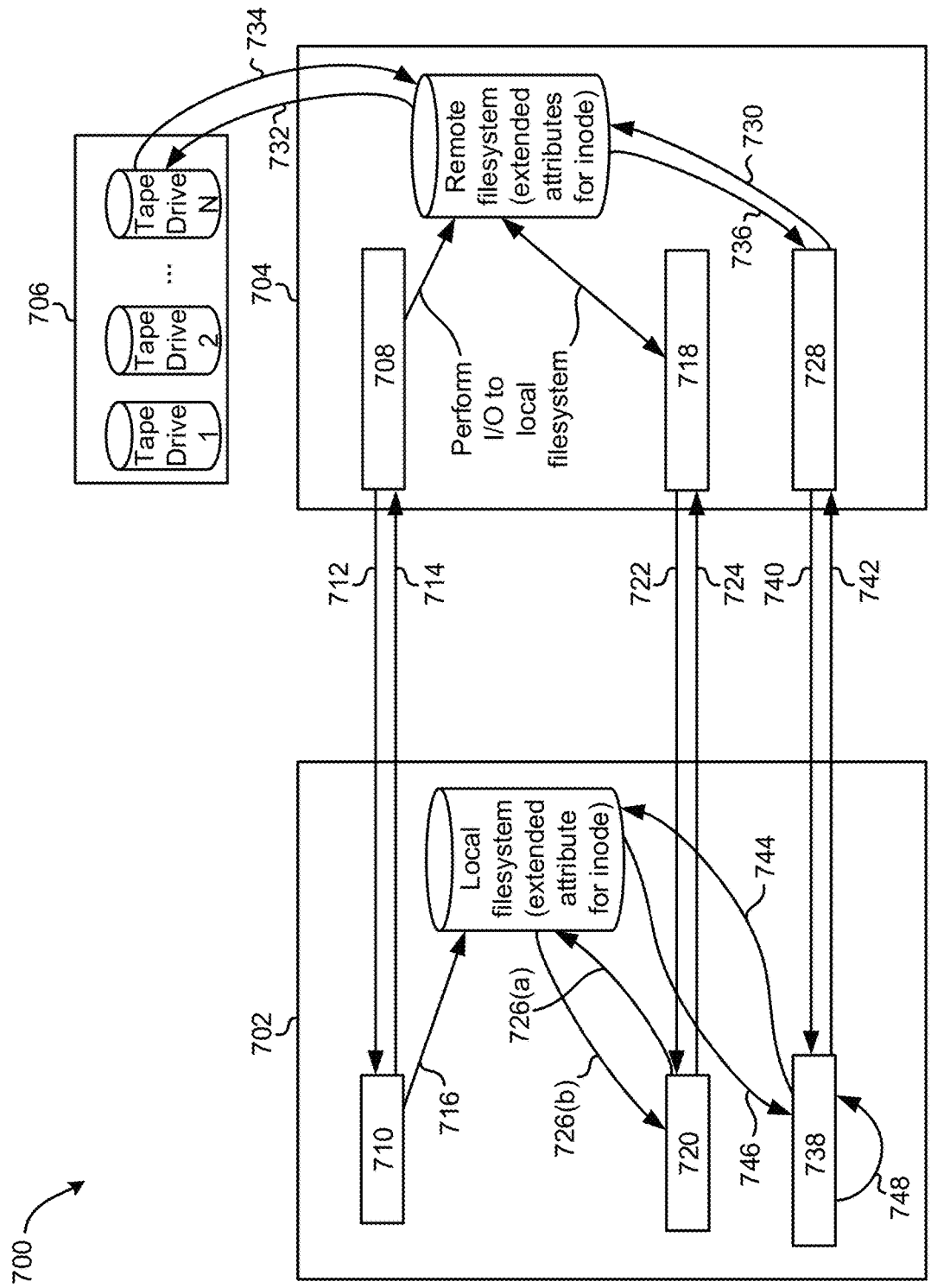
FIG. 7 is a clustered filesystem environment, in accordance with one embodiment.

FIG. 7 depicts a clustered filesystem environment 700, in accordance with one embodiment. As an option, the present environment 700 may be implemented in conjunction with features from any other embodiment listed herein, such as those described with reference to the other FIGS. Of course, however, such environment 700 and others presented herein may be used in various applications and/or in permutations which may or may not be specifically described in the illustrative embodiments listed herein. Further, the environment 700 presented herein may be used in any desired environment.

In FIG. 7, various communications exchanged between a first cluster site 702, e.g., a cache cluster in the current example, and a second cluster site 704, e.g., a home cluster in the current example, of the clustered filesystem environment 700, and various operations performed by the cluster sites 702, 704 are illustrated in accordance with one embodiment. Moreover, a HSM server 706 is attached to the home cluster site 704 and the DMAPI stub is only synced to the cache cluster site 702 without recalling the migrated data. In some approaches, the first cluster site 702 may be an edge cache and/or a new production cluster. Moreover, in some approaches the second cluster site 704 may be a consolidated data site and/or an old production cluster, e.g., older than the first cluster site 702. The second cluster site 704 is connected to the HSM server 706 that includes a plurality of tape drives e.g., see Tape Drive 1-Tape Drive N.

Operation 708 includes performing a create operation for a file, e.g., testFile.

Operation 710 includes performing a lookup on the file, e.g., testFile, to fetch inode details from the home cluster site 704.

Operation 712 includes outputting a lookup operation, e.g., testFile, on the file to fetch inode details of the file created.

Operation 714 includes returning the inode details of the file being looked up, e.g., testFile.

Operation 716 includes storing remote attributes for the file, e.g., filehandle, remote inode mtime, ctime, etc., and updating the local inode on par with the remote inode that was looked up.

Operation 718 includes writing on the file, e.g., testFile.

Operation 720 includes performing a read operation on the same file, e.g., testFile, from cache, where the read operation preferably fetches data from the home cluster site 704 on the file.

Operation 722 includes performing a read operation using the file handle.

Operation 724 includes transferring data on the file being read, e.g., with the remote attributes.

Operation 726(a) includes updating a data read to disk.

Operation 726(b) includes acknowledging the local data write.

Operation 728 includes migrating the file's data to the HSM server 706, e.g., testFile.

Operation 730 incudes migrating a request to move data blocks from the local filesystem to the HSM server 706.

Operation 732 includes moving actual data blocks from the local filesystem over to the HSM server 706, e.g., tape drives.

Operation 734 includes receiving acknowledgment from the HSM server 706 with data locations on the tapes. The local filesystem inode stubs are updated with the HSM server locations of data for later recalls.

Operation 736 includes acknowledging the migrate request.

Operation 738 includes performing a lookup on the file, e.g., testFile, to revalidate and verify if the file's metadata has had a change at the home cluster site 704.

Operation 740 includes performing a next lookup operation, e.g., testFile, on the file to fetch inode details of the file created.

Operation 742 includes returning the inode details of the file being looked up, e.g., testFile. The DMAPI stub information is also fetched to reflect the migrated status that exists at the home cluster site 704.

Operation 744 includes releasing local data blocks on file and updating the DMAPI stub attributes received from the home cluster site 704.

Operation 746 includes acknowledging removal of local data blocks and setting of DMAPI stub attributes.

Operation 748 includes moving files to the migrated state.

Figure 8:
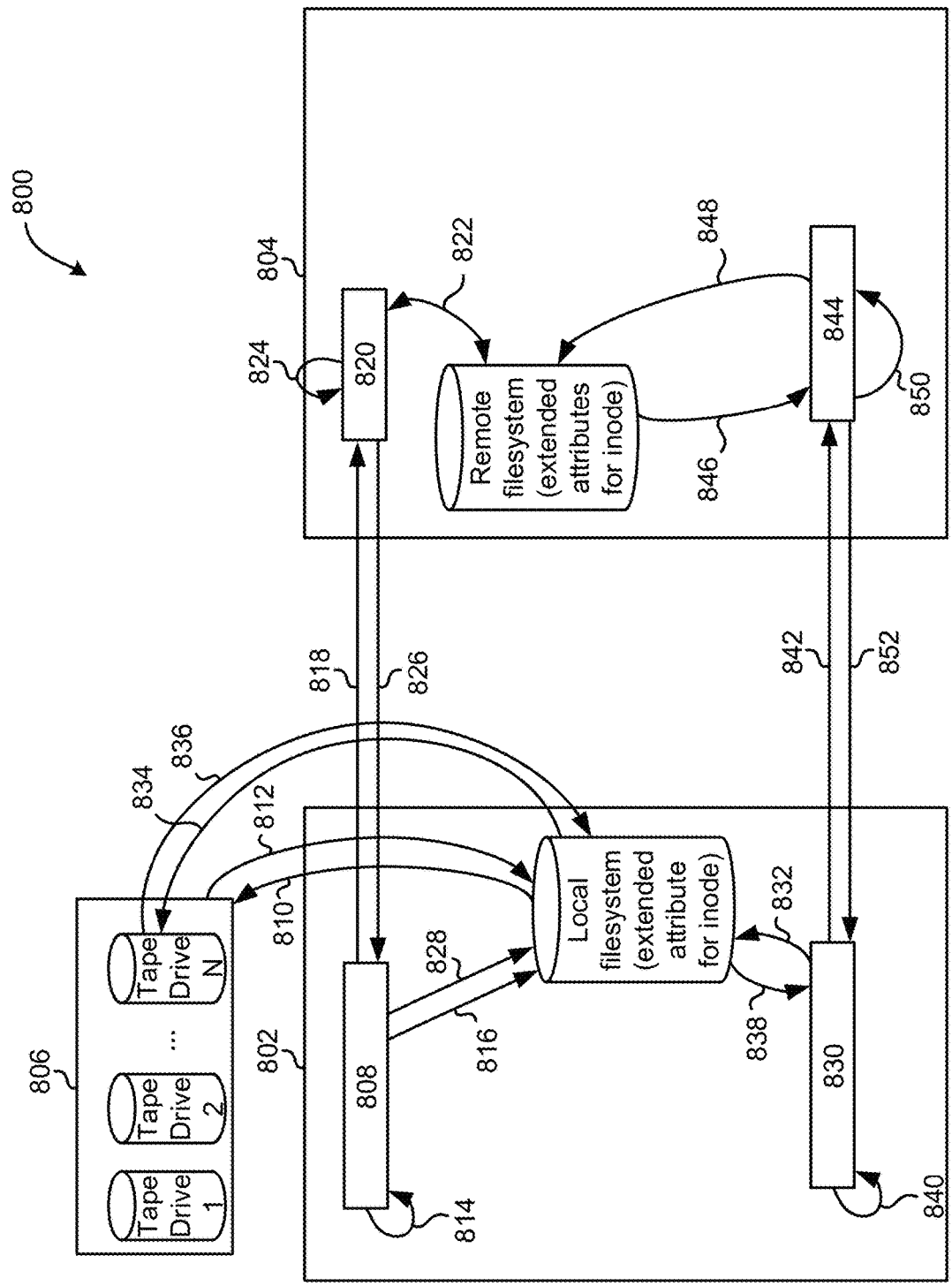
FIG. 8 is a clustered filesystem environment, in accordance with one embodiment.

FIG. 8 depicts a clustered filesystem environment 800, in accordance with one embodiment. As an option, the present environment 800 may be implemented in conjunction with features from any other embodiment listed herein, such as those described with reference to the other FIGS. Of course, however, such environment 800 and others presented herein may be used in various applications and/or in permutations which may or may not be specifically described in the illustrative embodiments listed herein. Further, the environment 800 presented herein may be used in any desired environment.

In FIG. 8, various communications exchanged between a first cluster site 802, e.g., a cache cluster in the current example, and a second cluster site 804, e.g., a home cluster in the current example, of the clustered filesystem environment 800, and various operations performed by the cluster sites 802, 804 are illustrated in accordance with one embodiment. Moreover, a HSM server 806 is attached to the cache cluster site 802 and the migrated data is recalled on read and push DMAPI stubs only to the second cluster site 804. In some approaches, the first cluster site 802 may be an edge cache and/or a new production cluster. Moreover, in some approaches the second cluster site 804 may be a consolidated data site and/or an old production cluster, e.g., older than the first cluster site 802. The first cluster site 802 is connected to the HSM server 806 that includes a plurality of tape drives e.g., see Tape Drive 1-Tape Drive N.

In operation 808 a read on a migrated file us triggered, e.g., testFile. This triggers a recall of data blocks from the HSM server 806 to the local filesystem.

Operation 810 includes recalling data from the HSM server 806 to be located locally in the filesystem, as well as on the HSM server 806.

Operation 812 includes moving a copy of the data blocks over to the local filesystem.

Operation 814 includes moving files to the pre-migrated state.

Operation 816 includes retrieving the remote attributes for writing.

Operation 818 includes updating DMAPI attributes alone from the cache cluster site 802 to the home cluster site 804.

Operation 820 includes updating DMAPI extended attributes on the file.

Operation 822 includes updating the DMAPI stub attributes but also letting the local filesystem data blocks to reside.

Operation 824 includes moving files to the pre-migrated state.

Operation 826 includes returning acknowledgement of a successful DMAPI attribute update, e.g., with updated remote attributes.

Operation 828 includes updating the remote attributes.

Operation 830 includes optionally choosing to migrate the file's data to the HSM server 806 again, e.g., testFile.

Operation 832 includes generating a migrate request to move data blocks from the local filesystem to the HSM server 806.

Operation 834 includes moving actual data blocks from the local filesystem over to the HSM server 806, e.g., tape drives.

Operation 836 includes returning acknowledgement from the HSM server 806 with data locations on the tapes. The local filesystem inode stubs are updated with the HSM data locations for later recalls.

Operation 838 includes acknowledging the migrate request.

Operation 840 includes moving files to the migrated state.

Operation 842 includes performing a DMAPI attribute update using the file handle.

Operation 844 includes simulating a complete migrated status for the file.

Operation 846 includes releasing local data blocks of the file and updating the DMAPI stub attributes received from the cache cluster site 802.

Operation 848 includes acknowledging removal of local data blocks and setting of DMAPI stub attributes.

Operation 850 includes moving files to the migrated state.

Operation 852 includes returning an acknowledgement of the update of attributes to the cache cluster site 802.

Figure 9:
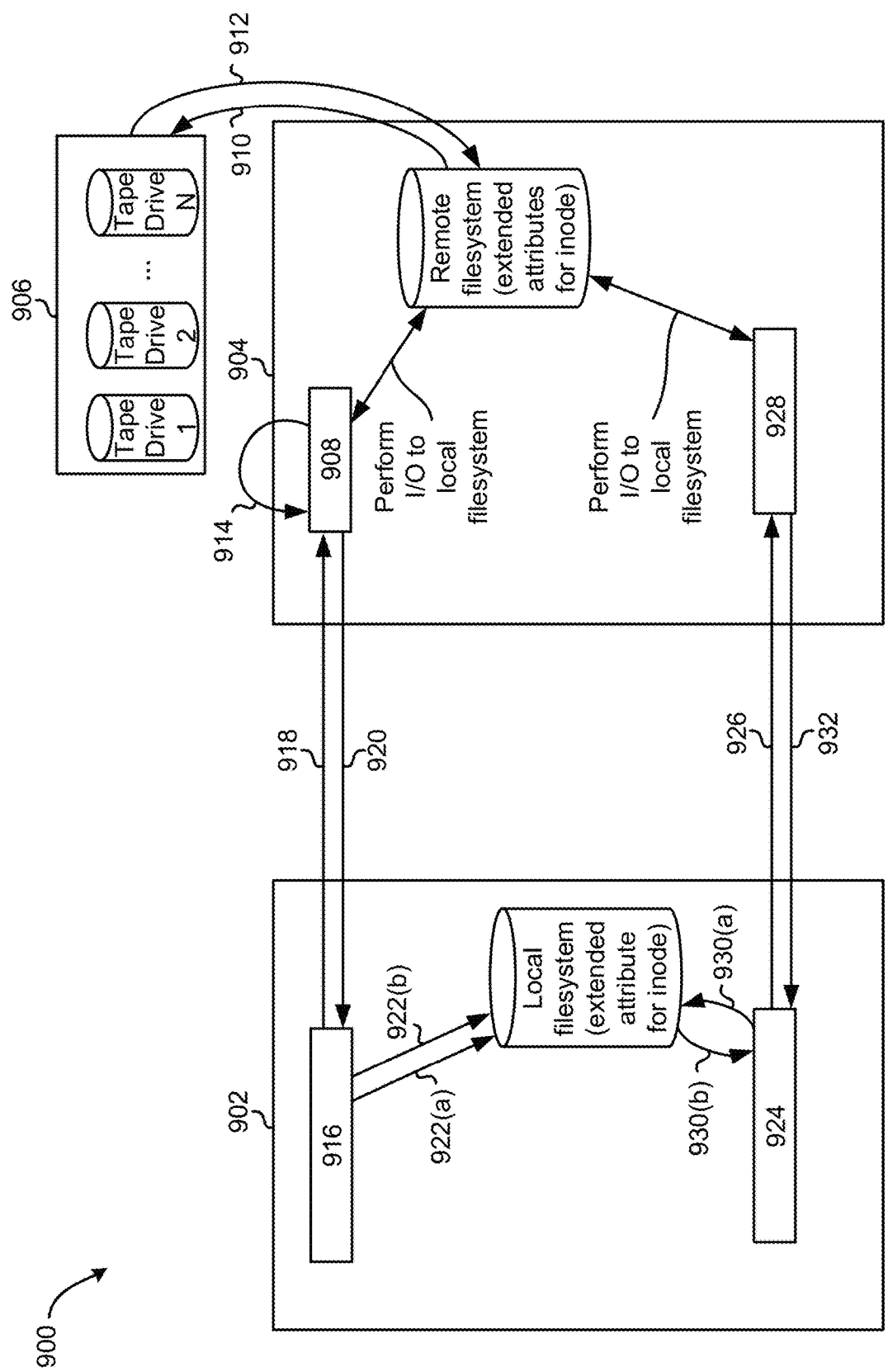
FIG. 9 is a clustered filesystem environment, in accordance with one embodiment.

FIG. 9 depicts a clustered filesystem environment 900, in accordance with one embodiment. As an option, the present environment 900 may be implemented in conjunction with features from any other embodiment listed herein, such as those described with reference to the other FIGS. Of course, however, such environment 900 and others presented herein may be used in various applications and/or in permutations which may or may not be specifically described in the illustrative embodiments listed herein. Further, the environment 900 presented herein may be used in any desired environment.

In FIG. 9, various communications exchanged between a first cluster site 902, e.g., a cache cluster in the current example, and a second cluster site 904, e.g., a home cluster in the current example, of the clustered filesystem environment 900, and various operations performed by the cluster sites 902, 904 are illustrated in accordance with one embodiment. Moreover, a HSM server 906 is attached to the home cluster site 904 and recalling the migrated data occurs on read request from the cache cluster site 902 and a pullback stub only to the cache cluster site 902. In some approaches, the first cluster site 902 may be an edge cache and/or a new production cluster. Moreover, in some approaches the second cluster site 904 may be a consolidated data site and/or an old production cluster, e.g., older than the first cluster site 902. The second cluster site 904 is connected to the HSM server 906 that includes a plurality of tape drives e.g., see Tape Drive 1-Tape Drive N.

Operation 908 includes recalling migrated data of a file, e.g., testFile, from the HSM server 906. This may be based on a read request at the cache cluster site 902 or within the home cluster site 904.

In operation 910 a recall request to bring a copy of data blocks to the local filesystem, but also keeps one copy valid on the HSM server 906, e.g., in order to serve the read request.

Operation 912 includes moving a copy of the data blocks from the HSM server 906 over to the local filesystem.

Operation 914 includes moving files to the pre-migrated state.

Operation 916 includes performing a lookup operation on the file.

Operation 918 includes outputting a lookup operation, e.g., testFile, on the file to fetch inode details of the file created.

Operation 920 includes returning the inode details, along with DMAPI attributes. Also, availability of data blocks on the file are initiated locally, e.g., pre-migrated.

Operation 922(a) includes storing remote attributes for the file includes recalling migrated data of a file, e.g., testFile, from the HSM server 906. This may be based on a read request at the cache cluster site 902 or within the home cluster site 904. Operation 922(b) includes marking the file as uncached, and thereby the next read can actually fetch data from the home site.

In operation 924 a read operation on the same file, e.g., testFile, from the cache cluster site 902 needs to fetch data the home cluster site 904 on the file.

Operation 926 includes performing a read operation using the file handle.

Operation 928 includes serving local data.

Operation 930(a) includes updating data read to disk.

Operation 930(b) includes acknowledging a local data write.

Operation 932 includes transferring data on the file being read, with updated remote attributes.

Figure 10:
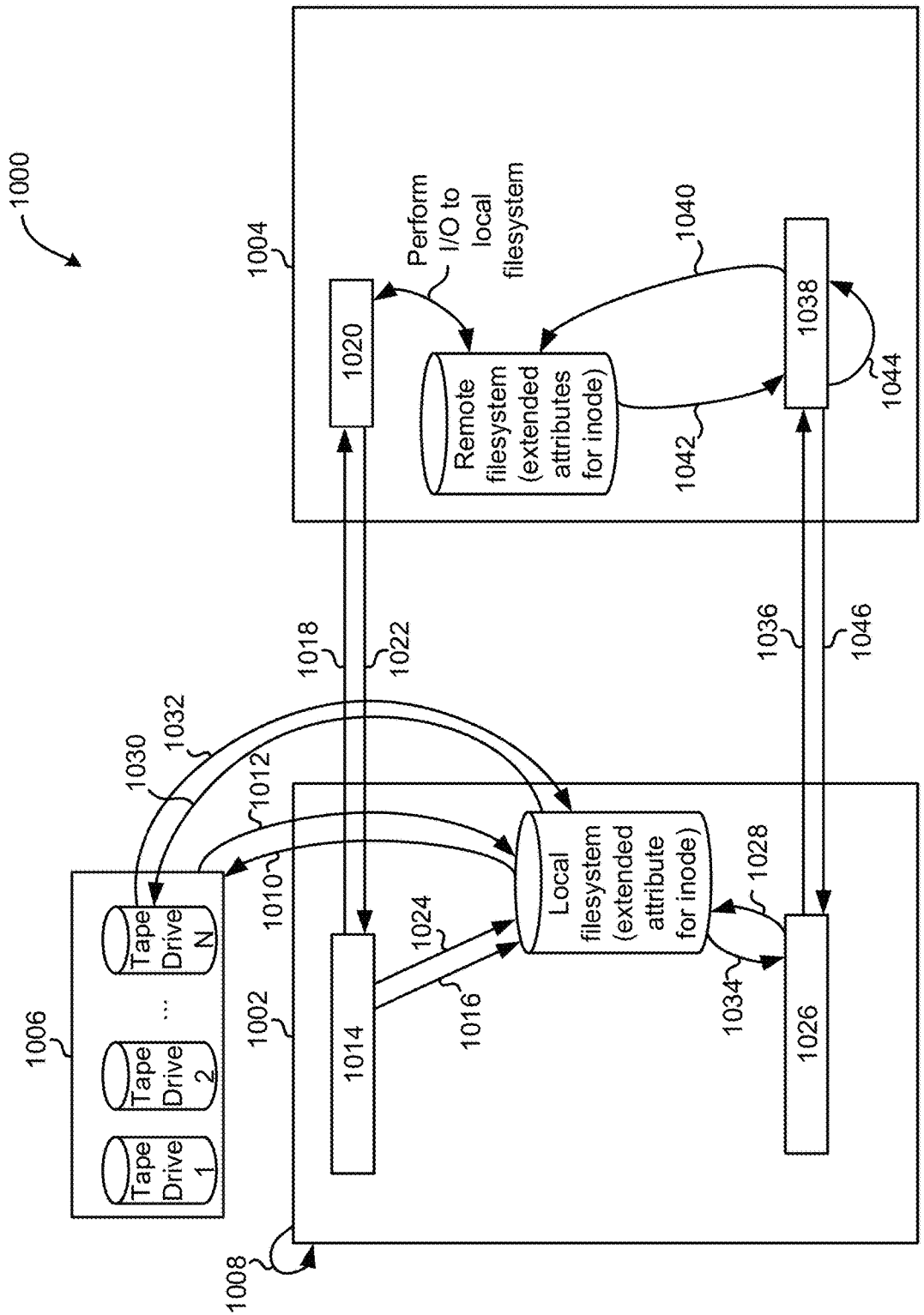
FIG. 10 is a clustered filesystem environment, in accordance with one embodiment.

FIG. 10 depicts a clustered filesystem environment 1000, in accordance with one embodiment. As an option, the present environment 1000 may be implemented in conjunction with features from any other embodiment listed herein, such as those described with reference to the other FIGS. Of course, however, such environment 1000 and others presented herein may be used in various applications and/or in permutations which may or may not be specifically described in the illustrative embodiments listed herein. Further, the environment 1000 presented herein may be used in any desired environment.

In FIG. 10, various communications exchanged between a first cluster site 1002, e.g., a cache cluster in the current example, and a second cluster site 1004, e.g., a home cluster in the current example, of the clustered filesystem environment 1000, and various operations performed by the cluster sites 1002, 1004 are illustrated in accordance with one embodiment. Moreover, a HSM server 1006 is attached to the cache cluster site 1002 and the migrated data is recalled on data changes and push/replicate to the second cluster site 1004. In some approaches, the first cluster site 1002 may be an edge cache and/or a new production cluster. Moreover, in some approaches the second cluster site 1004 may be a consolidated data site and/or an old production cluster, e.g., older than the first cluster site 1002. The first cluster site 1002 is connected to the HSM server 1006 that includes a plurality of tape drives e.g., see Tape Drive 1-Tape Drive N.

Operation 1008 includes recovery of a missed replication, or complete resynchronization of all cache files to the home cluster site 1004 or migrated data is modified in the local filesystem.

Operation 1010 includes recalling data from the HSM server 1006 to be located locally as well so that the file data can then be written to the home cluster site 1004. The file moves to complete resident in this case having data only on the filesystem.

Operation 1012 includes moving the data over to the local filesystem disks and removing it on the HSM server 1006.

Operation 1014 includes performing a write operation on the same file, e.g., testFile.

Operation 1016 includes retrieving the remote attributes for writing.

Operation 1018 includes performing the write operation using the file handle.

Operation 1020 includes performing a write on the file, e.g., testFile.

Operation 1022 includes returning an acknowledgement of a successful write, with updated remote attributes.

Operation 1024 includes updating the remote attributes.

Operation 1026 includes optionally electing to migrate the file's data to the HSM server 1006 again, e.g., testFile.

Operation 1028 includes migrating the request to move data blocks from the local filesystem to the HSM server 1006.

Operation 1030 includes moving actual data blocks from the local filesystem over to the HSM server 1006, e.g., tape drives.

In operation 1032 an acknowledgement is returned from the HSM server 1006 with data locations on the tape. The local filesystem mode stubs are updated with HSM data locations for later recalls.

Operation 1034 includes acknowledging the migrate request.

Operation 1036 includes a performing DMAPI attribute update using the file handle.

Operation 1038 includes simulating a complete migrated status for the file.

Operation 1040 includes releasing local data blocks of the file and updating the DMAPI stub attributes received from the cache cluster site 1002.

Operation 1042 includes acknowledging removal of local data blocks and setting of DMAPI stub attributes.

Operation 1044 includes moving the file to the migrated state.

Operation 1046 includes acknowledging an update of attributes to the cache site.

Figure 11:
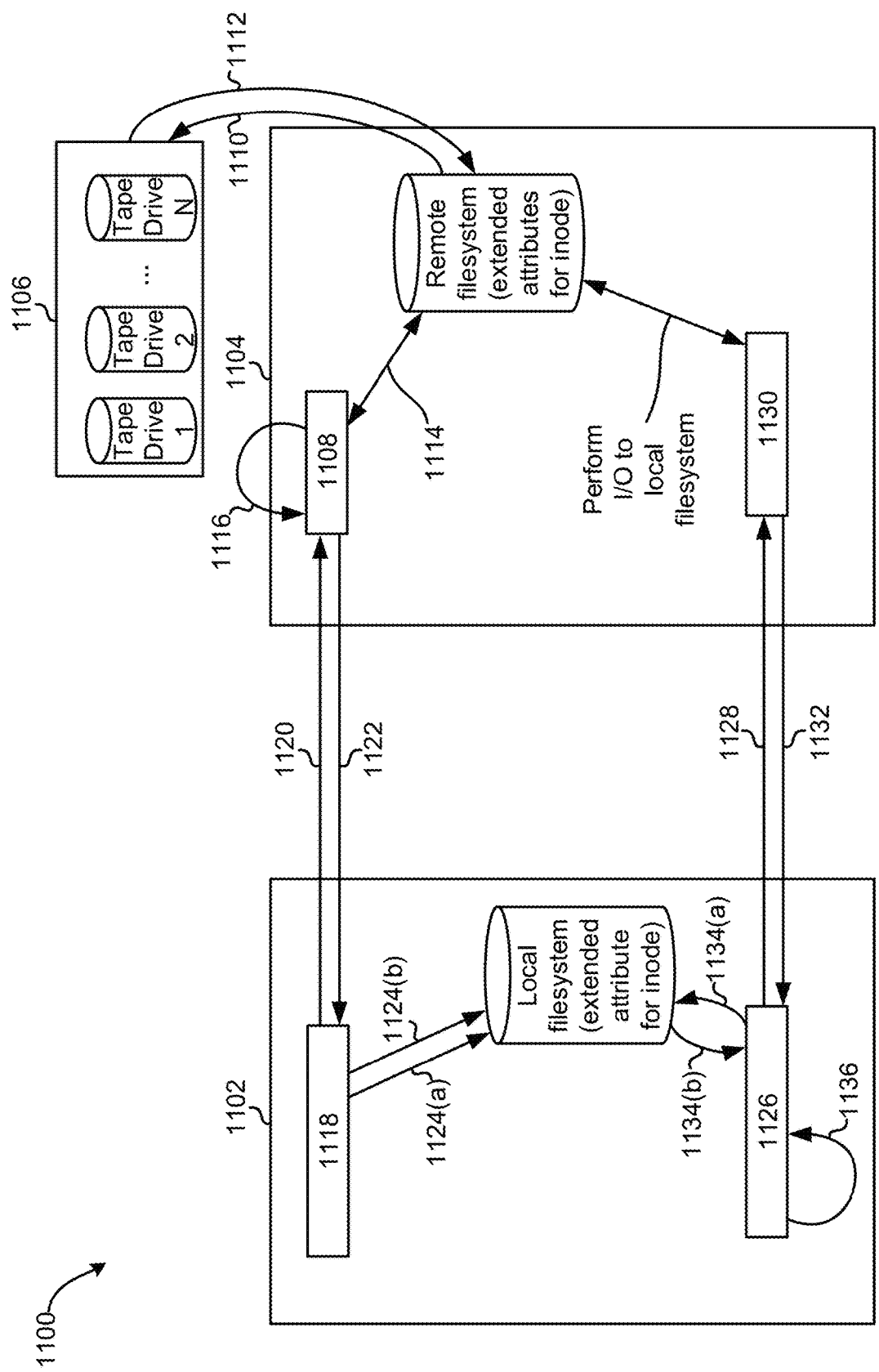
FIG. 11 is a clustered filesystem environment, in accordance with one embodiment.

FIG. 11 depicts a clustered filesystem environment 1100, in accordance with one embodiment. As an option, the present environment 1100 may be implemented in conjunction with features from any other embodiment listed herein, such as those described with reference to the other FIGS. Of course, however, such environment 1100 and others presented herein may be used in various applications and/or in permutations which may or may not be specifically described in the illustrative embodiments listed herein. Further, the environment 1100 presented herein may be used in any desired environment.

In FIG. 11, various communications exchanged between a first cluster site 1102, e.g., a cache cluster in the current example, and a second cluster site 1104, e.g., a home cluster in the current example, of the clustered filesystem environment 1100, and various operations performed by the cluster sites 1102, 1104 are illustrated in accordance with one embodiment. Moreover, a HSM server 1106 is attached to the home cluster site 1104 and recalling the migrated data occurs only when data changes occur and pullback to the cache cluster site 1102. In some approaches, the first cluster site 1102 may be an edge cache and/or a new production cluster. Moreover, in some approaches the second cluster site 1104 may be a consolidated data site and/or an old production cluster, e.g., older than the first cluster site 1102. The second cluster site 1104 is connected to the HSM server 1106 that includes a plurality of tape drives e.g., see Tape Drive 1-Tape Drive N.

Operation 1108 includes recalling migrated data of a file, e.g., testFile, from the HSM server 1106. This may be based on a write request at the home cluster site 1104.

Operation 1110 includes issuing a recall request to move all data blocks to the local filesystem and remove the HSM server copy of the data since the file will soon be modified.

Operation 1112 includes moving the data blocks over to the local filesystem disks and removing it on the HSM server 1106.

Operation 1114 includes removing the HSM stub info in the inode and putting recalled data on the file to disk.

Operation 1116 includes moving the file to the resident state.

Operation 1118 includes performing the lookup operation on the file.

Operation 1120 includes performing a lookup operation, e.g., testFile, on the file to fetch inode details on the created file.

Operation 1122 includes returning the inode details along with the DMAPI attributes. Availability of local disk data may be disclosed along with the removal of DMAPI HSM stub info on the inode.

Operation 1124(a) includes storing remote attributes for the file, e.g., filehandle, remote inode mtime, ctime, etc., and updating the local inode on par with the remote looked up inode.

Operation 1124(b) includes marking the file as uncached, and hence the next read can actually fetch data from the home cluster site. Also, removal of the HSM DMAPI attributes on par with the home site may be performed.

In operation 1126 a read operation on the same file, e.g., testFile, from cache needs to fetch data from the home cluster site 1104 on the file.

Operation 1128 includes performing the read operation using the file handle.

Operation 1130 includes serving the local data.

Operation 1132 includes transferring data on the file being read, with updated remote attributes.

Operation 1134(a) includes updating data read to disk.

Operation 1134(b) includes acknowledging the local data write.

Operation 1136 includes moving the file to the resident state.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving, on a first cluster site, extended attributes associated with a first data operation, wherein the first data operation was previously performed on data of a filesystem of second cluster site;
   in response to a second data operation being performed on data of a filesystem of the first cluster site, storing extended attributes associated with the second data operation to a predetermined file of the filesystem of the first cluster site;
   outputting, to the second cluster site, the extended attributes stored to the predetermined file of the filesystem of the first cluster site to facilitate matching between extended attributes stored on the second cluster site and the extended attributes stored to the predetermined file of the first cluster site; and
   in response to a determination that a predefined event has occurred on the second cluster site, using the received extended attributes to fulfill a third data operation.

2. The computer-implemented method of claim 1, wherein the predefined event is a failure event of the second cluster site.

3. The computer-implemented method of claim 2, wherein the second cluster site is connected to a hierarchical storage management system prior to the failure event of the second cluster site, and comprising: instructing the first cluster site to connect to the hierarchical storage management system during the failure event to enable fulfillment of the third data operation by the first cluster site.

4. The computer-implemented method of claim 2, wherein the first cluster site is a backup destination of the second cluster site, wherein fulfilling the third data operation includes allowing an application to perform the third data operation on the first cluster site, wherein the third data operation was previously scheduled to be performed by the application on the second cluster site.

5. The computer-implemented method of claim 2, wherein the first cluster site is a cache cluster site, wherein the second cluster site is a home cluster site, and comprising: storing extended attributes associated with fulfilling the third data operation while the second cluster site is non-operational as a result of the failure event; and performing a failback operation in response to a determination that the second cluster site has recovered from the failure event.

6. The computer-implemented method of claim 5, wherein the third data operation is a data migration operation, wherein the failback operation includes outputting the extended attributes of entries of data migrated during the data migration operation, wherein the failback operation does not include migrating data associated with the third data operation other than the extended attributes to the second cluster site.

7. The computer-implemented method of claim 1,
   wherein the second cluster site is a home cluster site that is connected to a hierarchical storage management system,
   wherein the first cluster site is a cache cluster site, and
   comprising: performing a migration process for replacing the home cluster site with the cache cluster site, wherein the migration process includes:
      storing, on the first cluster site, the extended attributes associated with the first data operation,
      connecting the first cluster site to the hierarchical storage management system, and
      using the extended attributes to modify a current migration state of an entry of data that is stored on the hierarchical storage management system,
      wherein the migration process does not include migrating data from the second cluster site to the first cluster site,
      wherein an application operating on the first cluster site before completion of the migration process does not result in a recall of data from the second cluster site being triggered.

8. The computer-implemented method of claim 1, wherein the first cluster site is a cache cluster site, wherein the second cluster site is a home cluster site, and comprising: outputting, from the cache cluster site to the home cluster site, a query for current extended attributes of the home cluster site, wherein the extended attributes associated with the first data operation are received on the cache cluster site in response to the query being output.

9. The computer-implemented method of claim 8, wherein the query is output with a flag, wherein presence of the flag in the query is indicative that the query includes a request for extended attributes, wherein queries output from the cache cluster site to the home cluster site for information other than extended attributes are not output with the flag.

10. A computer program product, the computer program product comprising a computer readable storage medium having program instructions embodied therewith, the program instructions readable and/or executable by a controller to cause the controller to:
   receive, by the controller, on a first cluster site, extended attributes associated with a first data operation, wherein the first data operation was previously performed on data of a filesystem of second cluster site;
   in response to a second data operation being performed on data of a filesystem of the first cluster site, store, by the controller, extended attributes associated with the second data operation to a predetermined file of the filesystem of the first cluster site;

output, by the controller, to the second cluster site, the extended attributes stored to the predetermined file of the filesystem of the first cluster site to facilitate matching between extended attributes stored on the second cluster site and the extended attributes stored to the predetermined file of the first cluster site; and in response to a determination that a predefined event has occurred on the second cluster site, use, by the controller, the received extended attributes to fulfill a third data operation.

11. The computer program product of claim 10, wherein the predefined event is a failure event of the second cluster site.

12. The computer program product of claim 11, wherein the second cluster site is connected to a hierarchical storage management system prior to the failure event of the second cluster site, and the program instructions readable and/or executable by the controller to cause the controller to: instruct, by the controller, the first cluster site to connect to the hierarchical storage management system during the failure event to enable fulfillment of the third data operation by the first cluster site.

13. The computer program product of claim 11, wherein the first cluster site is a backup destination of the second cluster site, wherein fulfilling the third data operation includes allowing an application to perform the third data operation on the first cluster site, wherein the third data operation was previously scheduled to be performed by the application on the second cluster site.

14. The computer program product of claim 11, wherein the first cluster site is a cache cluster site, wherein the second cluster site is a home cluster site, and the program instructions readable and/or executable by the controller to cause the controller to: store, by the controller, extended attributes associated with fulfilling the third data operation while the second cluster site is non-operational as a result of the failure event; and perform, by the controller, a failback operation in response to a determination that the second cluster site has recovered from the failure event.

15. The computer program product of claim 14, wherein the third data operation is a data migration operation, wherein the failback operation includes outputting the extended attributes of entries of data migrated during the data migration operation, wherein the failback operation does not include migrating data associated with the third data operation other than the extended attributes to the second cluster site.

16. The computer program product of claim 10, wherein the second cluster site is a home cluster site that is connected to a hierarchical storage management system,
wherein the first cluster site is a cache cluster site, and
the program instructions readable and/or executable by the controller to cause the controller to: perform, by the controller, a migration process for replacing the home cluster site with the cache cluster site, wherein the migration process includes:

storing, on the first cluster site, the extended attributes associated with the first data operation,
connecting the first cluster site to the hierarchical storage management system, and
using the extended attributes to modify a current migration state of an entry of data that is stored on the hierarchical storage management system,
wherein the migration process does not include migrating data from the second cluster site to the first cluster site,
wherein an application operating on the first cluster site before completion of the migration process does not result in a recall of data from the second cluster site being triggered.

17. The computer program product of claim 10, wherein the first cluster site is a cache cluster site, wherein the second cluster site is a home cluster site, and the program instructions readable and/or executable by the controller to cause the controller to: output, by the controller, from the cache cluster site to the home cluster site, a query for current extended attributes of the home cluster site, wherein the extended attributes associated with the first data operation are received on the cache cluster site in response to the query being output.

18. The computer program product of claim 17, wherein the query is output with a flag, wherein presence of the flag in the query is indicative that the query includes a request for extended attributes, wherein queries output from the cache cluster site to the home cluster site for information other than extended attributes are not output with the flag.

19. A system, comprising:
a processor; and
logic integrated with the processor, executable by the processor, or integrated with and executable by the processor, the logic being configured to:
receive, on a first cluster site, extended attributes associated with a first data operation, wherein the first data operation was previously performed on data of a filesystem of second cluster site;
in response to a second data operation being performed on data of a filesystem of the first cluster site, store, extended attributes associated with the second data operation to a predetermined file of the file system of the first cluster site;
output, to the second cluster site, the extended attributes stored to the predetermined file of the filesystem of the first cluster site to facilitate matching between extended attributes stored on the second cluster site and the extended attributes stored to the predetermined file of the first cluster site; and
in response to a determination that a predefined event has occurred on the second cluster site, use the received extended attributes to fulfill a third data operation.

20. The system of claim 19, wherein the predefined event is a failure event of the second cluster site.

* * * * *